United States Patent [19]

Temmyo et al.

[11] Patent Number: 5,283,896
[45] Date of Patent: Feb. 1, 1994

[54] METHOD AND SYSTEM FOR CONTROLLING MUTUALLY EXCLUSIVE RESOURCES USING A MODIFIED PETRI NET PROCESS CONTROL GRAPH

[75] Inventors: Takashi Temmyo, Tokyo; Masaki Hasegawa, Kamakura, both of Japan

[73] Assignee: International Business Machines Corporation, Armonk, N.Y.

[21] Appl. No.: 478,818

[22] Filed: Feb. 12, 1990

[30] Foreign Application Priority Data

Feb. 13, 1989 [JP] Japan .................................. 1-311461

[51] Int. Cl.⁵ .............................................. G06F 9/46
[52] U.S. Cl. ..................................... 395/650; 395/725; 364/DIG. 1; 364/281.3; 364/281.4; 364/281.5; 364/281.7
[58] Field of Search .................. 364/DIG. 1, DIG. 2; 395/375, 650, 725, 775

[56] References Cited

U.S. PATENT DOCUMENTS

| | | | |
|---|---|---|---|
| 4,866,605 | 9/1989 | Nakano et al. | 395/500 |
| 4,922,413 | 5/1990 | Stoughton et al. | 395/800 |
| 5,029,080 | 7/1991 | Otsuki | 395/375 |

OTHER PUBLICATIONS

"MFG (Mark Flow Graph)-Based Programmable Controller and its Application to FMS," by K. Hasegawa et al., Proc. of the International Conference on System Engineering, 1984, pp. 306-311.
"A Petri Net Control Unit for High-Speed Modular Signal Processors," by S. C. Brofferio, IEEE Transactions on Communications, vol. Com-35, No. 6, Jun. 1987, pp. 577-583.

Primary Examiner—Thomas C. Lee
Assistant Examiner—John C. Loomis
Attorney, Agent, or Firm—Lauren C. Bruzzone; John J. Timar

[57] ABSTRACT

A method and system for controlling mutually exclusive resources and for preventing deadlocks in a multitasking computer system by generating a graph containing nodes to which are mapped the tasks included in a flow of processes and the critical resources which may be appropriated by at least one of the tasks. The nodes of tasks executed sequentially are arranged sequentially; the nodes of tasks executed in parallel are arranged in parallel with each other and each node of a critical resource is arranged in parallel with every node which may appropriate it. Every time a signal to being execution of a task is transmitted, a token is generated in the task node and the critical resource node is parallel with the task node. Referring to the graph, when the completion of the current task in the process flow is detected, a signal to being execution of the immediately succeeding task is delayed until a token is assigned to any one of the immediately succeeding task nodes and the critical resource nodes arranged in parallel with it.

7 Claims, 23 Drawing Sheets

Program for Controlling Flow

```
M01   Program Main
M02   begin
M03     while ¬END do
M04       begin
M05         if (t1 is Okay) then
M06           begin
M07             with robot2 do
M08               begin
M09                 R2 ( p1 );
M10               end
M11           end
M12         if (t2 is Okay) then
M13           begin
M14             with robot1 do
M15               begin
M16                 R1 ( p2 );
M17               end
M18           end
M19         if (t4 is Okay) then
M20           begin
M21             with ( robot1, robot2 ) do
M22               begin
M23                 R1 ( p31 );
M24                 R2 ( p31 );
M25                 R1 ( p32 );
M26                 R2 ( p32 );
M27                 R1 ( p33 );
M28                 R2 ( p33 );
M29               end
M30           end
M31         if (t6 is Okay) then
M32           begin
M33             with ( robot1, robot2 ) do
M34               cobegin
M35                 R2 ( p4 );
M36                 R1 ( p5 );
M37               coend
M38           end
M39       end
M40   end
```

FIG 3A

Program for Robot 1

```
R101    Program R1 ( p )
R102    begin
R103      case ( p )
R104        p2:
R105          begin
R106            SPEED(50);
R107            OPEN();
R108            DELAY(2);
R109            MOVE(BCSTATU,BCSTATD);
R110            CLOSE();
R111            DELAY(2);
R112            MOVE(BCSTATU);
R113            IF A = 0 THEN MOVE(ALTBLUO,ALTBLDO);
R114            IF A = 1 THEN MOVE(ALTBLU1,ALTBLD1);
R115            IF A = 2 THEN MOVE(ALTBLU2,ALTBLD2);
R116            OPEN();
R117            DELAY(2);
R118            IF A = 0 THEN MOVE(ALTBLUO);
R119            IF A = 1 THEN MOVE(ALTBLU1);
R120            IF A = 2 THEN MOVE(ALTBLU2);
R121            A := A + 1;
R122          end
R123        p31:
R124          begin
R125            SPEED(50);
R126            OPEN();
R127            DELAY(2);
R128            MOVE(PPASSB);
R129          end
R130        p32:
R131          begin
R132            MOVE(PPASSF);
R133            CLOSE();
R134            DELAY(2);
R135          end
R136        p33:
R137          begin
R138            MOVE(PPASSB,DSPOSU,DSPOSD);
R139            OPEN();
R140            MOVE(DSPOSU,ALTBLUO);
R141          end
```

MATCH LINE TO FIG 3B₁

FIG 3B

_MATCH LINE TO FIG 3B_

```
R142        p4:
R143          begin
R144            SPEED(50);
R145            OPEN();
R146            A := A - 1;
R147            IF A < 0 THEN A := 0;
R148            IF A = 0 THEN MOVE(ALTBLU0,ALTBLD0);
R149            IF A = 1 THEN MOVE(ALTBLU1,ALTBLD1);
R150            IF A = 2 THEN MOVE(ALTBLU2,ALTBLD2);
R151            CLOSE();
R152            DELAY(2);
R153            IF A = 0 THEN MOVE(ALTBLU0);
R154            IF A = 1 THEN MOVE(ALTBLU1);
R155            IF A = 2 THEN MOVE(ALTBLU2);
R156            MOVE(BCSTATU);
R157            MOVE(BCSTATD);
R158            OPEN();
R159            DELAY(2);
R160            MOVE(BCSTATU);
R161            MOVE(ALTBLU0);
R162          end
R163        end
R164      end
```

FIG 3B₁

Program for Robot 2

```
R201    Program R2 ( p )
R202    begin
R203      case ( p )
R204        p1:
R205          begin
R206            OPEN();
R207            ARM(LEFT);
R208            MOVE(FRNTSTATU,FRNTSTATD);
R209            CLOSE();
R210            DELAY(8);
R211            MOVE(FRNTSTATU);
R212            ARM(RIGHT);
R213            MOVE(SBCSTATU,SBCSTATD);
R214            OPEN();
R215            DELAY(8);
R216            MOVE(SBCSTATU);
R217            MOVE(CNTTBLUO);
R218          end
R219        p31:
R220          begin
R221            ARM(LEFT);
R222            OPEN();
R223            DELAY(8);
R224            MOVE(FRNTSTATU,FRNTSTATD);
R225            CLOSE();
R226            DELAY(8);
R227            MOVE(FRNTSTATU);
R228            ARM(RIGHT);
R229            MOVE(CNTTBLUO,SPASS);
R230          end
R231        p32:
R232          begin
R233            OPEN();
R234            DELAY(8);
R235          end
R236        p33:
R237          begin
R238            MOVE(CNTTBLUO);
```

MATCH LINE TO FIG 3C₁

FIG 3C

_MATCH LINE TO FIG 3C_

```
R239           end
R240        p4:
R241          begin
R242            OPEN();
R243            ARM(LEFT);
R244            MOVE(FRNTSTATU,FRNTSTATD);
R245            CLOSE();
R246            DELAY(8);
R247            MOVE(FRNTSTATU);
R248            IF A = 0 THEN MOVE(CNTTBLU0,CNTTBLD0);
R249            IF A = 1 THEN MOVE(CNTTBLU1,CNTTBLD1);
R250            IF A = 2 THEN MOVE(CNTTBLU2,CNTTBLD2);
R251            A := A + 1;
R252            OPEN();
R253            DELAY(8);
R254            MOVE(CNTTBLU0);
R255          end
R256        end
R257     end
```

FIG 3C$_1$

EXAMPLE 1 OF EXECUTING PETRINET

EXAMPLE 2 OF EXECUTING PETRINET

METHOD AND SYSTEM FOR CONTROLLING MUTUALLY EXCLUSIVE RESOURCES USING A MODIFIED PETRI NET PROCESS CONTROL GRAPH

BACKGROUND OF THE INVENTION

1. Field of the Invention

This invention relates to a method and a system for controlling mutually exclusive resources that are available sequentially in an event driven process. The sequentially available resources are controlled by a computer, a programmable logic controller or the like.

2. Description of the Prior Art

Important concepts in the recent computer technology art are multitasking, multiprocessing and distributed processing. To implement these techniques, it is necessary to share a resource between several tasks or processes during parallel execution of a plurality of tasks or processes. Such a resource is called a shared resource, for example, various peripheral devices, disks, memories, communication lines, programs, and data. A shared resource that can be appropriated by one task or process at a time is called a critical resource.

The problem of controlling mutually exclusive resources in an event driven process arises when event driven processes are executed in parallel and compete for the shared resource. The mutually exclusive resource control mechanism assures that the shared resource will be held by at most one process. An area which holds a shared resource in the processes executed in parallel is called a critical section. The problem of sharing a resource when a plurality of tasks are executed in parallel is presented as a problem of interprocess communication and synchronization. To solve it conventionally, various techniques have been proposed, and analyzed by system models. The synchronization problem includes the mutual exclusion problem, the producer consumer problem, the dining philosopher problem, and the reader/writer problem.

At present, there is no way to solve the problem of automatically controlling access to a mutually exclusive resource among a plurality of competing processes. It is a burden for the programmer or the operator. Thus, whether a programmer writes a program executing in parallel, or an operator executes a program under such an environment, attention must always be paid to resource assignment. In implementing a parallel execution system, a programmer uses semaphores to control access.

An example of programming using semaphores will be explained as follows. It is assumed that there are three flows of event driven processes $G_1$, $G_2$ and $G_3$ as shown schematically in FIG. 2. In the first flow of process $G_1$, tasks $p_1$ and $p_2$ are processed sequentially. After the task $p_1$ has been executed while using shared resources A and C, the task $p_2$ is executed while using shared resources B and C.

In the second flow of process $G_2$, a task $P_3$ is executed. The task $P_3$ is executed while using the shared resources A, B and C. In the third flow of process $G_3$, tasks $P_4$ and $P_5$ are executed in parallel. The task $P_4$ is executed while using the shared resources A and C, and the task $P_5$ is simultaneously executed while using the shared resources B and C. The start or end points of the tasks are indicated by time marks $t_1$–$t_7$. It is assumed that, among the resources appearing in FIG. 2, the critical resources are A and B, and that the critical resource A is a robot 2, while the critical resource B is a robot 1.

At present, in most cases, software programming is performed for each critical resource, i.e., a controller for production apparatus in a manufacturing process, or a computer in a network system. This requires a program for each critical resource and a program for controlling them. An example of this is shown in FIGS. 3A–3C. FIG. 3A is a program for controlling the entire system; FIG. 3B is a program for controlling the robot 1; FIG. 3C is a program for controlling the robot 2.

The syntax for describing the parallel execution is as follows:

```
cobegin
  P1;
  P2
coend
``` wherein P1 and P2 are tasks executed in parallel.

In addition, syntax for describing a critical section is as follows:

```
with R do
  begin
    S
  end
``` wherein R is a unique name for a critical resource to be mutually excluded, and S is a critical section to be mutually excluded. In this case, R is a semaphore.

In FIG. 3A, R(p) is a program for a robot as indicated in FIGS. 3B and 3C, respectively. When a parameter p is passed to R, the program for R executes only the task for p.

The syntax for describing the critical section and its mechanism, as well as the syntax for describing the parallel execution and its mechanism are not supplied to the programmer generally, so that it becomes the responsibility of the programmer to write the description of the critical section, to produce its mechanism, and to debug the process for mutually exclusive control.

One technique that is widely used for modeling of a system is called a Petri-Net. Features of the Petri-Net are parallelism or simultaneousness and nonsynchronization. Its execution may be considered to be a series of discrete events with the timing when an event occurs being indefinite. Attempts have been made to utilize these features and the execution form for event driven control. The Petri-Net is useful in the simulation of a parallel execution system such as a computer model or a manufacturing process because of its mathematical analysis characteristics and modeling capabilities.

The Petri-Net consists of four components: a place, a transition, an arc, and a token. The place indicates an event, the transition indicates a condition, the arc indicates a path, and the token indicates a state. The token moves in the arc between the places according to the condition of the transition, and causes an event corresponding to the place.

FIG. 4 shows examples illustrating the execution of the Petri Net. In this example, the Petri Net is described by using a transition $T=\{t_a, t_b, t_c\}$, a place $P=\{P_x, P_y, P_z\}$, and a token. First, if there is no token in $P_x$, $t_a$ generates a token and places it in $P_x$ (FIG. 4A). If $P_x$ has a token, and $P_y$ and $P_z$ do not have a token, $t_b$ transfers the token to $P_y$ and $P_z$ (FIG. 4B). If $P_y$ and $P_z$ have a token, $t_c$ takes out and erases the token. More details on the Petri Net can be found in "Petri Net Theory and the Modeling of Systems" by J. L. Peterson, Prentice-Hall Inc., 1981.

In a conventional control system using Petri Nets, a programmer describes a flow of processes as shown in FIG. 2 or FIG. 4 by using a graphics editor and then converting the description into code to create a program for controlling the entire system so that, when starting a task or receiving a termination signal, the token is automatically transferred according to these signals based on the program in execution. Description of this system can be found in a paper authored by K. Hasegawa and K. Takahashi, "MFG (Mark Flow Graph)-Based Programmable Controller and its Application to FMS," published in the Proceedings of the International Conference on System Engineering, pp. 306-311, 1984.

However, the conventional control systems do not take the mutually exclusive control problem into consideration. Modeling of the mutually exclusive control problem is performed by creating a place corresponding to an empty state of a resource (empty place) and by connecting it to a place of a task using that resource to establish a critical section. In this case, it utilizes storability which is an important characteristic of the Petri-Net. The empty place contains a token as an initial marking, and always contains a token when a resource is not used. When a process is in a critical section and is using a resource, the empty place does not contain a token. If another process attempts to enter the critical section to use the same resource, it cannot be executed because the empty place does not contain a token and a firing condition is not satisfied. The execution of this other process is forced to wait until the process using the resource ends, releases the resource, and returns the token to the empty place.

FIG. 5 shows an example of this modeling. Place m indicates authorization to enter a critical section. When a process wants to enter the critical section, it supplies a token to $p_1$ or $p_2$ to indicate its readiness to enter the critical section, and waits for a signal allowing entrance into the critical section or the token of m to access the critical section. If both processes want to enter the critical section simultaneously, transitions $t_1$ and $t_2$ cause contention, and only one process can be fired. Firing of $t_1$ disables that of $t_2$, and the process 2 is delayed until the process 1 completes the critical section and returns the token to m.

A control system for providing mutually exclusive control cannot be implemented easily if a graph having empty places for critical resources is created, and converted into codes so as to create a control program for the entire system with the token being automatically transferred. The reasons for this are as follows:

1. The empty places must be incorporated in the Petri-Net. If a programmer incorporates the empty places in a suitable location in the Petri Net while paying attention to critical resources, his effort will be equivalent to programming using semaphores. The creation of the Petri Net becomes very difficult for even a slightly complicated case as illustrated in FIG. 6 as compared with a simple case as illustrated in FIG. 5.
2. In execution, a user must first distinguish the empty places (resource places) from task places, and then place initial tokens in all empty places. This imposes a significant burden on the user.
3. A deadlock may be caused from the representation of the Petri Net itself.

This can be further explained by taking the situation in FIG. 6 as an example. It is assumed that the current state is as shown in FIG. 6A. That is, the tasks $P_1$ and $P_4$ are being executed, and the resources $P_x$ and $P_y$ are empty. The resource $P_x$ is used by the tasks $P_2$, $P_3$ and $P_6$. The resource $P_y$ is used by the tasks $P_3$, $P_5$ and $P_6$.

If the state is as shown in FIG. 6A, then it is clear that the control system can start the execution of the tasks $P_2$ and $P_5$. Thus, $t_1$ and $t_4$ transfer the tokens to $P_2$ and $P_5$, respectively. Here, it should be noted that, because the representation as shown in FIG. 5 or FIG. 6 connects each end of the critical section to the empty place of the resource, the token is never transferred to the empty place of $P_x$ until the execution of the task $P_3$ following the task $P_2$ is completed, and that, similarly, the token is never transferred to the empty place of $P_y$ until the execution of the task $P_6$ following the task $P_5$ is completed. FIG. 6B shows the positions of the tokens after starting the execution of the tasks $P_2$ and $P_5$. Now, the control system cannot start the execution of the task $P_3$ even if the execution of the task $P_2$ is completed because there is no token in the empty place of $P_y$. A token is never returned to the empty place of $P_x$ unless the execution of the task $P_3$ is started. Thus, the execution of the task $P_6$ is not started either. In this way, the transitions $t_2$ and $t_5$ cannot fire and thus cause a deadlock. In the Petri Net, whenever transitions cannot fire, a deadlock results.

In a mathematical representation, $G = (P, T, O)$ where G is the Petri Net structure, $P = \{P_1, P_2, \ldots P_M\}$ is a set of places with $M > 0$, and $T = \{T_1, T_2, \ldots T_L\}$ is a set of transitions with $L > 1$. The set of places and the set of transitions are disjoint, and $P \cap T = \Phi$. I: $P \rightarrow T$ is an input function from a place to a transition. O: $T \rightarrow P$ is an output function from a transition to a place. A Petri Net structure to which is added a marking $\mu$ for assignment of a token to a place is called a marked Petri-Net. The token exists only in the place, and firing of the transition controls execution. Firing of the transition transfers a token from an input place to an output place. The Petri Net structure is dual in the graph theory. The concept of the dual of a graph is not utilized in the marked Petri-Net because the dual of a graph is difficult to define.

SUMMARY OF THE INVENTION

It is therefore an object of this invention to provide a method and system for controlling mutually exclusive resources.

The invention enables a user to perform mutually exclusive control of sequentially available resources together with event driven control by describing the event driven control in terms of a process flow graph and a task program. The invention automatically performs programming and execution for the management of resources in the process removing the burden of preventing errors in a resource management program from the programmer, and removing the burden of executing the program from the operator.

In addition, the invention provides the advantage that a deadlock which may occur in a conventional Petri-Net representation is avoided by assigning a token to a condition gate described herein.

According to the invention, the method involves first generating a graph in a storage device, the graph containing nodes to which are mapped the tasks included in a flow of processes and the critical resources which may be appropriated by at least one of the tasks. The nodes of tasks executed sequentially are arranged sequentially; the nodes of tasks executed in parallel are being arranged in parallel with each other, and each node of a critical resource is arranged in parallel with every node which may appropriate it.

Each time a signal to begin execution of a task is transmitted, a token is generated in the task node and the critical resource node in parallel with the task node. Referring to said graph, when the completion of the current task in the process flow is detected, a signal to begin execution of the immediately succeeding task is delayed in its transmission until a token is assigned to any one of the immediately succeeding task nodes and the critical resource nodes arranged in parallel with it.

It is preferable in the process flow graph to provide gate nodes in the graph at each location where nodes of the tasks that are sequentially executed are connected;

Every time the completion of the execution of a task is detected, the tokens are removed from the node of the task and each critical resource that is arranged in parallel with the task node.

After detecting the completion of execution for tasks corresponding to every task node arranged immediately before a gate node, a token is generated in the gate node, and then, while a token is being assigned to any one of the nodes for a succeeding task arranged immediately after the gate node or nodes of any critical resource arranged in parallel with it, the transmission of a signal to begin the execution of the succeeding task is delayed.

Finally, the token is removed from the gate node after the transmission of the signal to begin the execution of the succeeding task.

The preferred system for controlling mutually exclusive resources according to the invention includes a storage device holding a graph having nodes representing the tasks contained in a flow of processes and nodes corresponding to each critical resource capable of being exclusively appropriated by any of the tasks. In the graph, nodes of tasks that are sequentially executed are arranged in series, the nodes of the tasks that are executed in parallel are arranged in parallel, a gate node is arranged at each location connecting the nodes of the tasks with each other, and a node for each critical resource is arranged in parallel with the nodes of all tasks capable of exclusively appropriating the critical resource.

The preferred system includes means for generating the tokens in the node of the current task in the graph and in the node of each critical resource that is arranged in parallel with the current task node every time a task beginning signal is transmitted. The system includes means for removing the tokens assigned to the node of the current task and to the node of each critical resource arranged in parallel with the current task node every time the end of the execution of the task is detected. The system includes means for generating a token in the gate node when the completion of execution for tasks corresponding to every task node arranged immediately before a gate node is detected, and means for delaying the transmission of a signal to begin the execution of the succeeding task until a token exists in a node for a succeeding task arranged immediately after the gate node or a node of a critical resource arranged in parallel with the task. Finally, the system includes means for removing the token from the gate node after the signal to begin the succeeding task is transmitted.

BRIEF DESCRIPTION OF THE DRAWINGS

FIGS. 3A, 3B, 3B$_1$, 3C, 3C$_1$ contain pseudocode representations of a prior art method for controlling mutually exclusive resources.

DETAILED DESCRIPTION OF A PREFERRED EMBODIMENT

Figure 1:
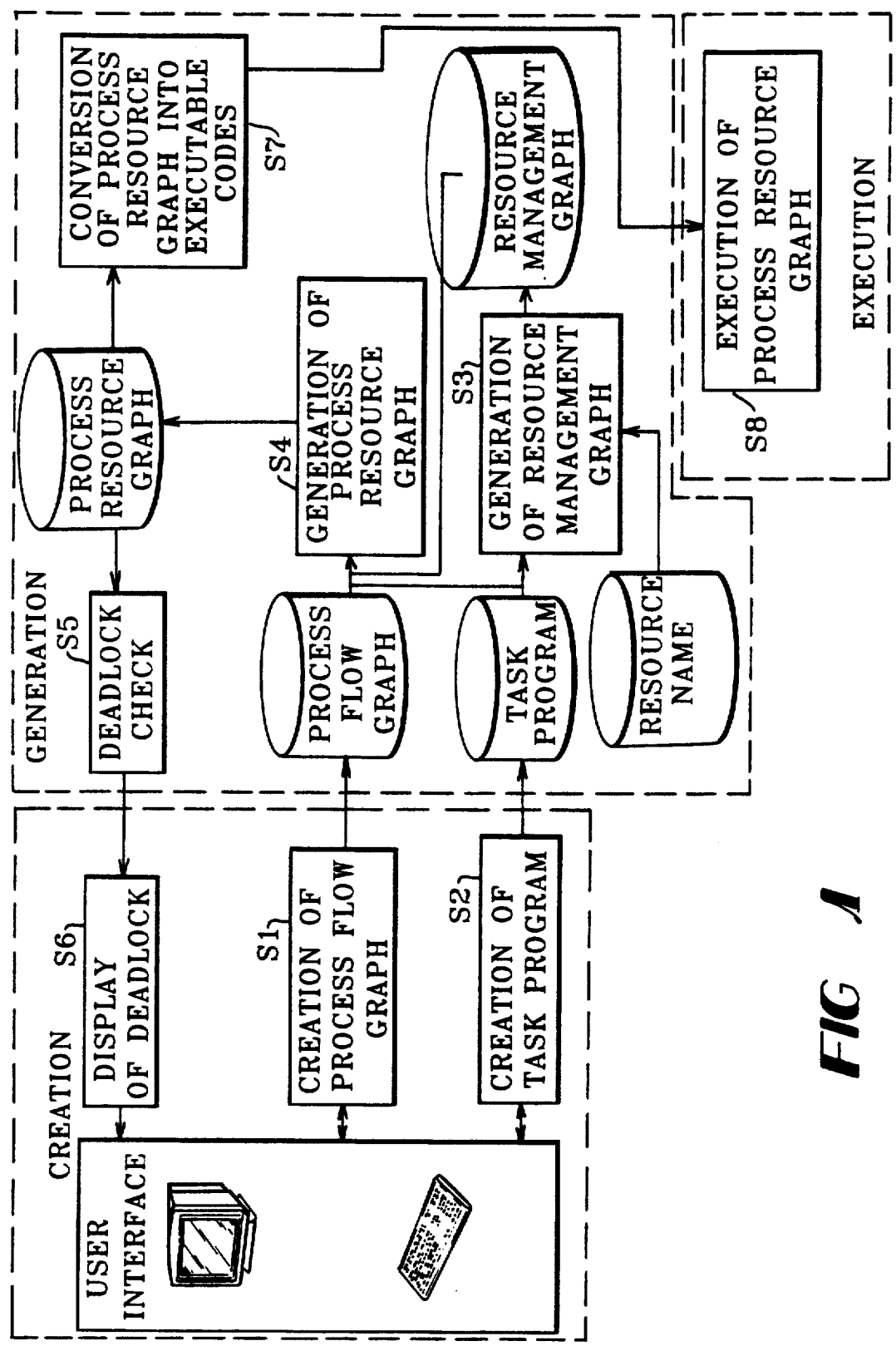
FIG. 1 is a system block diagram illustrating the preferred embodiment of the invention.
Figure 2:
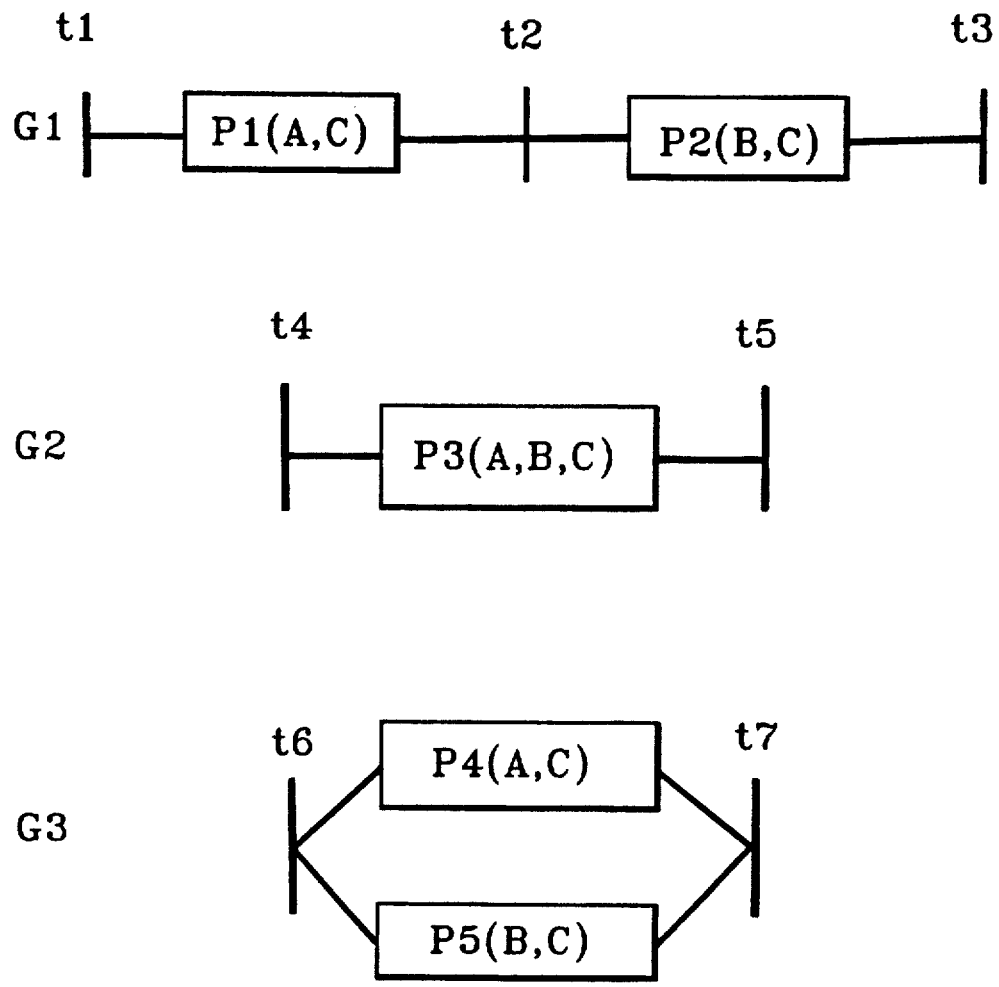
FIG. 2 is a schematic diagram illustrating the flows of three event driven processes.
Figure 4A:
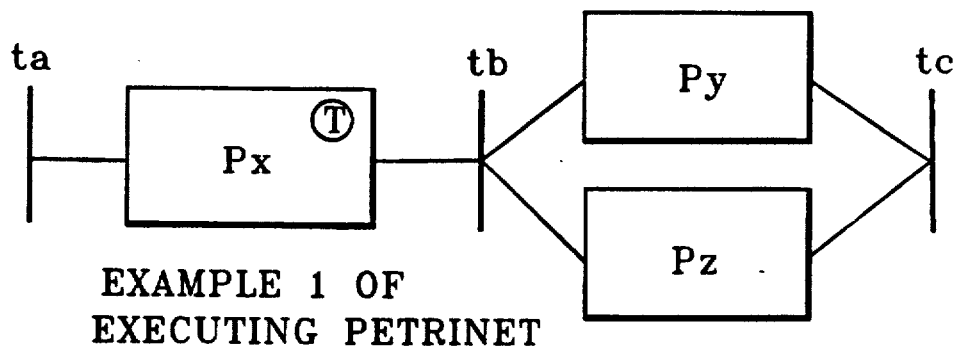
FIGS. 4A, 4B are diagrams illustrating examples of the execution of a Petri net.
Figure 4B:
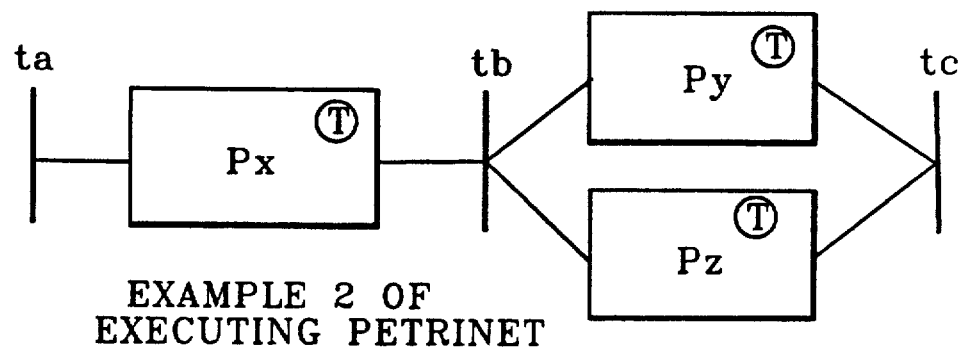
Figure 5:
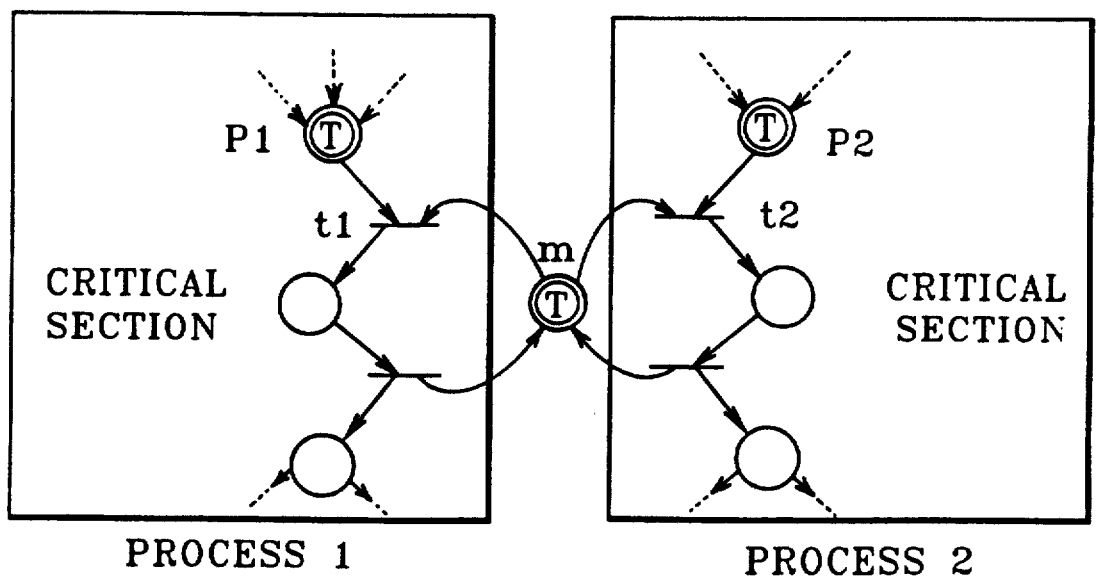
FIG. 5 is a diagram illustrating a model for mutually exclusive control employing the Petri net.

Referring now to the drawings, and more particularly to FIG. 1, there is shown a system configuration of the preferred embodiment of the invention. Steps S1-S8 in the figure are described in order.

(a) Creation of a process flow graph (step S1)

A user creates a process flow graph representing an event driven process with a task as a unit of process. The created process flow graph is equivalent to a restricted Petri Net graph with a safe and active nature (without multibranch or self loop). Refer to the Appendix for the mathematical representation of the process flow graph.

As methods for creating the process flow graph, there is a first method in which the process flow graph is described with graphical symbols by using a graphics editor, and then converted to a text representation, and a second method in which the process flow graph is directly described with character codes by using a text editor. The process flow graph created in this manner is also called a process flow program.

Figure 7:
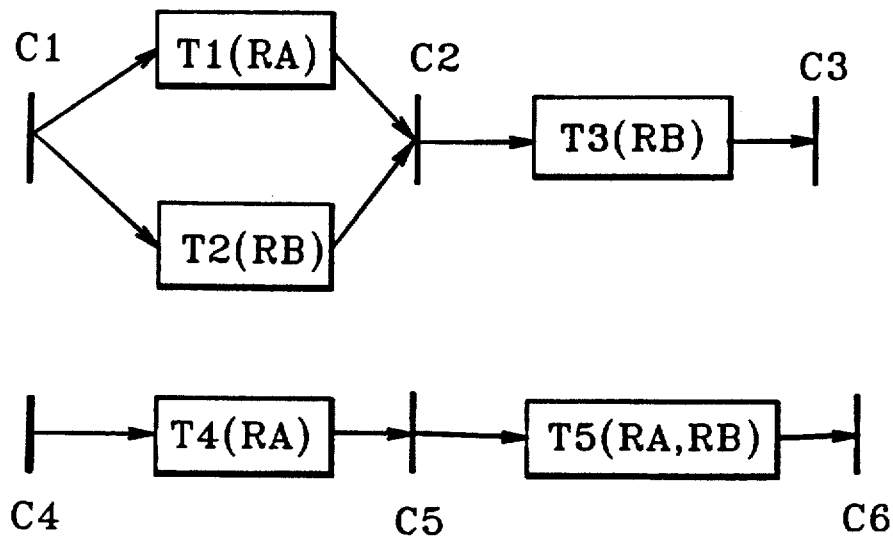
FIG. 7 is a diagram illustrating the process flow graph of this invention.

In the preferred embodiment, the user describes the process flow graph interactively with a graphics editor. FIG. 7 shows a graphical representation of the process flow program. A unit of control on the process flow graph is called a task, which corresponds to a program file (see FIG. 8).

An example of execution subsequent to the definition of the process flow graph is explained by referring to FIG. 7. A token is generated in a condition gate $C_1$ or $C_4$. In the case where the token is generated in the condition gate $C_1$, the token moves to task places $T_1$ and $T_2$ where tasks $T_1$ and $T_2$ are executed by using resources $R_A$ and $R_B$. When both tasks $T_1$ and $T_2$ have been completed, the token moves to task place $T_3$ according to the condition of the condition gate $C_2$. The task $T_3$ is executed by using the resource $R_B$. Then, when the task $T_3$ is completed, the token moves from the place $T_3$ to the condition gate $C_3$, and is removed. In the case where the token is generated in the condition gate $C_4$, the token moves to task place $T_4$ where the task $T_4$ is executed by using the resource $R_A$. When the task $T_4$ is completed, the token moves to a task place $T_5$ according to the condition of the condition gate $C_5$. The task $T_5$ is executed by using the resources $R_A$ and $R_B$. Then, when the task $T_5$ is completed, the token moves from the place $T_5$ to the condition gate $C_6$, and is removed. This example of execution does not contain the mutually exclusive resource control function. Here, the condition gate corresponds to the transition in the Petri-Net, but definitely differs from the transition in that the condition gate allows a token to be assigned to itself.

A text representation of the process flow program is created in the form of intermediate codes of the process flow graph. It is equivalent to the graphical representation, and each representation can be converted to the other representation. In the following description, the text representation of the graph is also referred to as the intermediate code.

The format for the intermediate code of the process flow graph is as follows:
  Condition gate:
    Input place (, input place . . . )/
    Output place (, output place . . . )
The intermediate code for the embodiment shown in FIG. 7 is as follows.
  $C_1$: /$T_1$, $T_2$
  $C_2$: $T_1$, $T_2$/$T_3$
  $C_3$: $T_3$/
  $C_4$: /$T_4$
  $C_5$: $T_4$/$T_5$
  $C_6$: $T_5$/

(b) Generation of resource management graph (steps S2 and S3)

Figure 9:
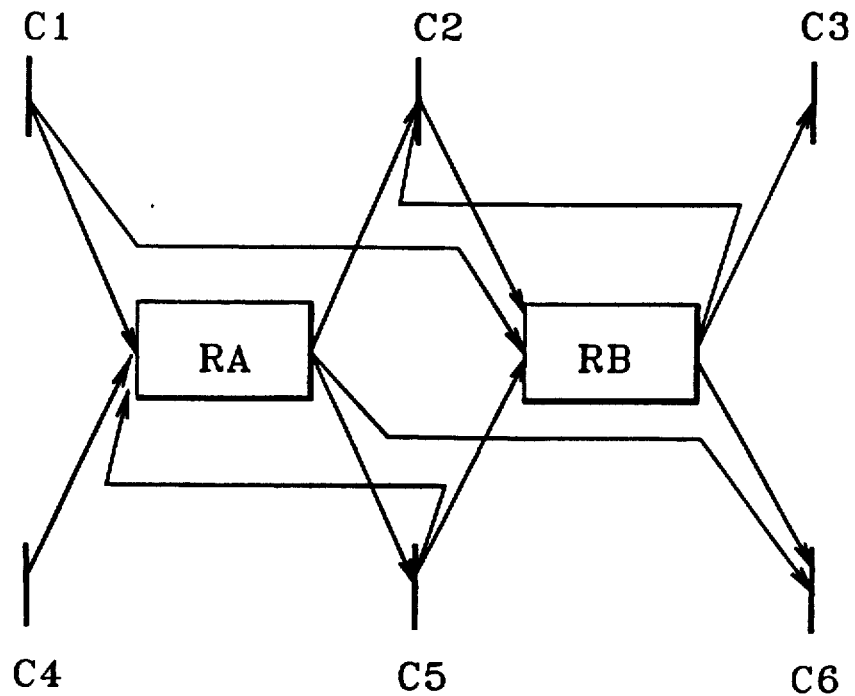
FIG. 9 is a diagram illustrating the resource management graph of this invention.
Figure 8:
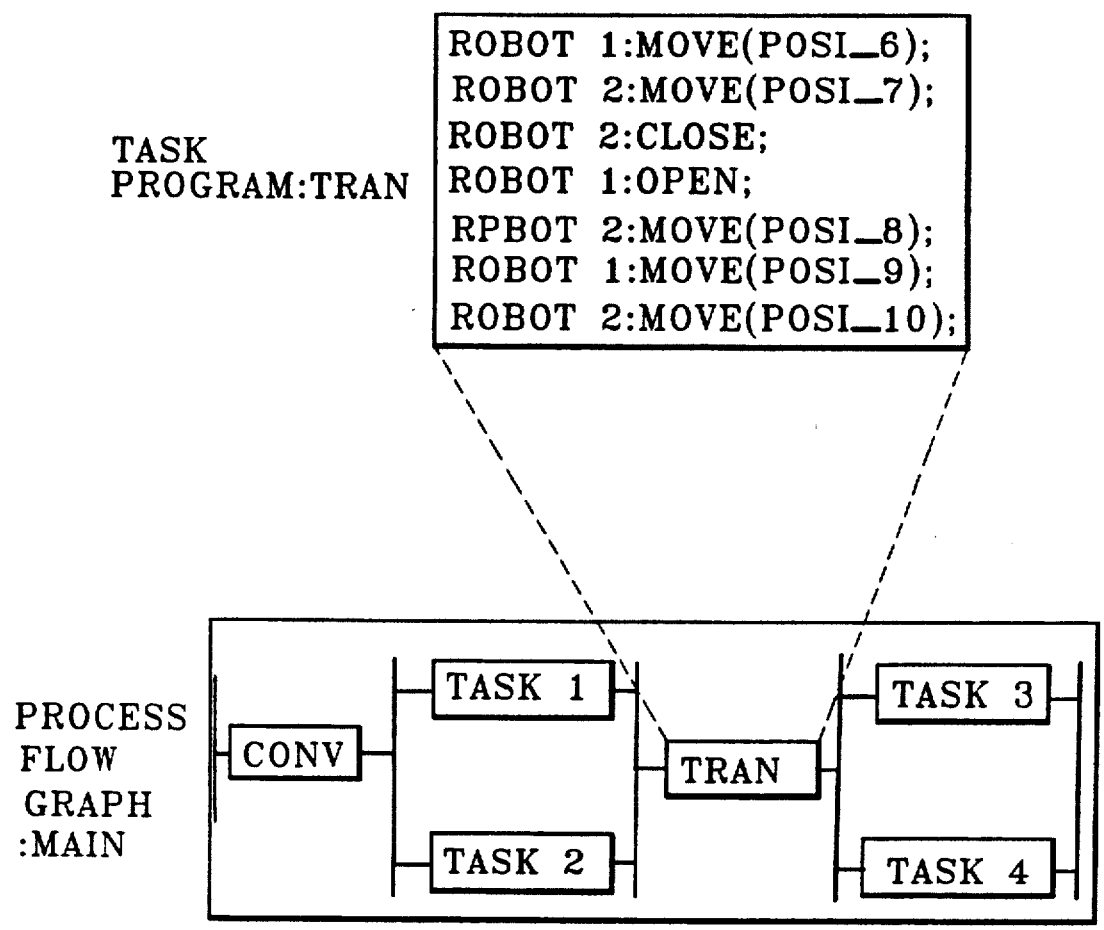
FIG. 8 is a diagram illustrating both a process flow graph and a task program.

A resource management graph is generated from the process flow graph and the task program. Resource names of critical resources necessary for the tasks are extracted from the task programs, thereby generating a list of them. As shown in FIG. 8, when the task program is described in a text, the critical resources described therein are described by logical symbols of the resources, logical numbers of the resources, or logical names of the resources. A resource management graph is generated from the process flow graph and the list which extracted the resource names. FIG. 9 shows a resource management graph generated from the process flow graph of FIG. 7 and the resource name list of the critical resources necessary for the tasks.

It should be noted that, as shown in FIG. 8, the user is never required to pay attention to resource management by using semaphores or the like, in creating a program of a process flow graph describing connections between tasks, or a task program describing an individual task.

In the embodiment shown in FIG. 8, the program is described with an object oriented language by using a text editor in the following format.

Logical name of resource: command

A list is created that extracts the names of the critical resources used by the task from the logical names of critical resources in the task programs. A resource management graph is generated from the list and the process flow graph.

If the format for the intermediate code of the resource management graph is made the same as that for the intermediate code of the process flow graph, the intermediate code for the resource management graph of FIG. 9 is as follows:
  $C_1$: /$R_A$, $R_B$
  $C_2$: $R_A$, $R_B$/$R_B$
  $C_3$: $R_B$/
  $C_4$: /$R_A$
  $C_5$: $R_A$/$R_A$, $R_B$
  $C_6$: $R_A$, $R_B$/

Figure 10:
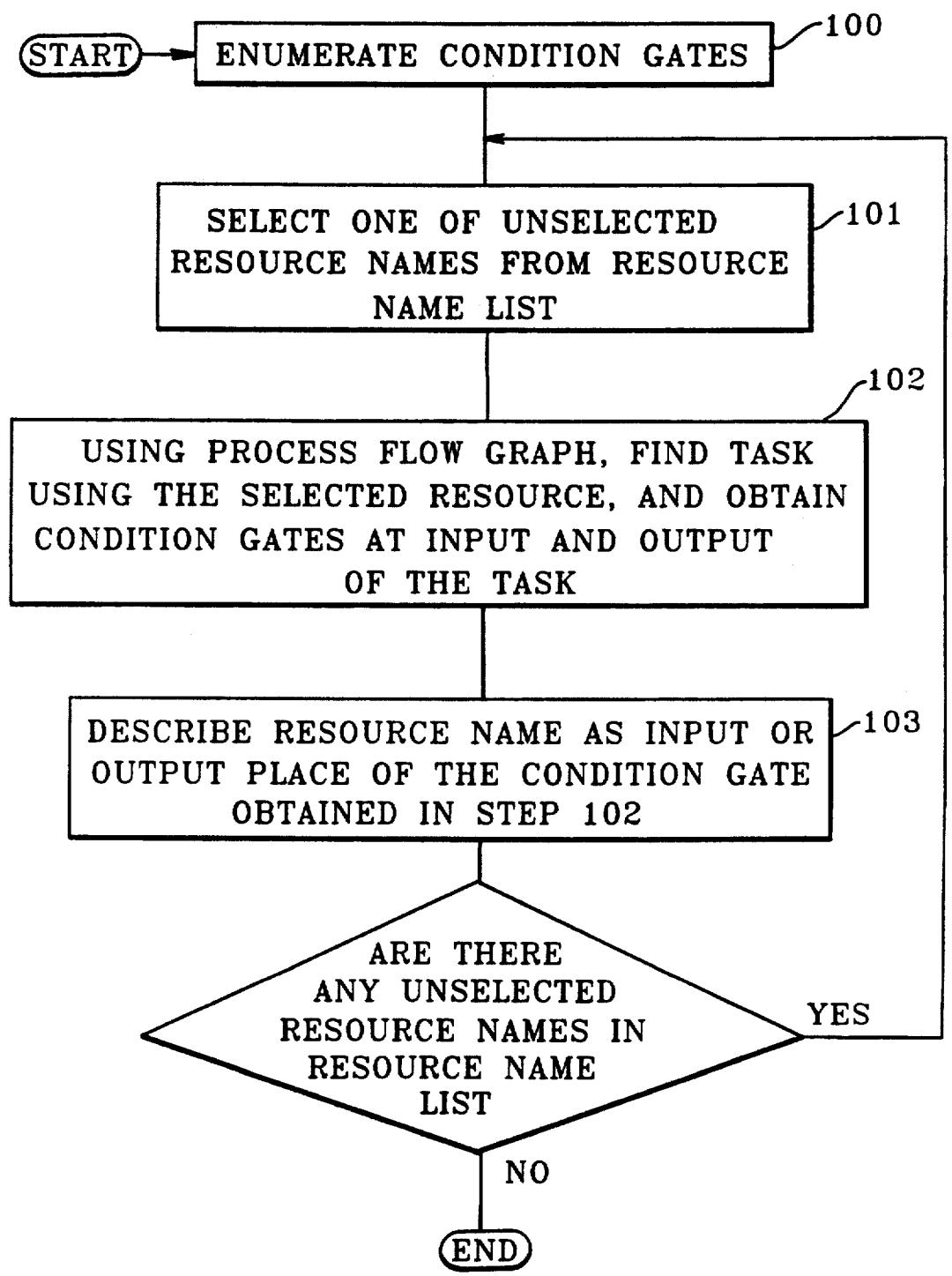
FIG. 10 is a flowchart illustrating the processing procedures for generating a resource management graph.

FIG. 10 is a flowchart illustrating an algorithm for generating the intermediate code from the process flow graph and the resource name list. If all resources are critical, the resource name list may be created by automatically extracting all resource names contained in the task program. The user may also create the resource name list by specifying the critical resource names.

(c) Generation of process resource graph (steps S4, S5, and S6)

Figure 11:
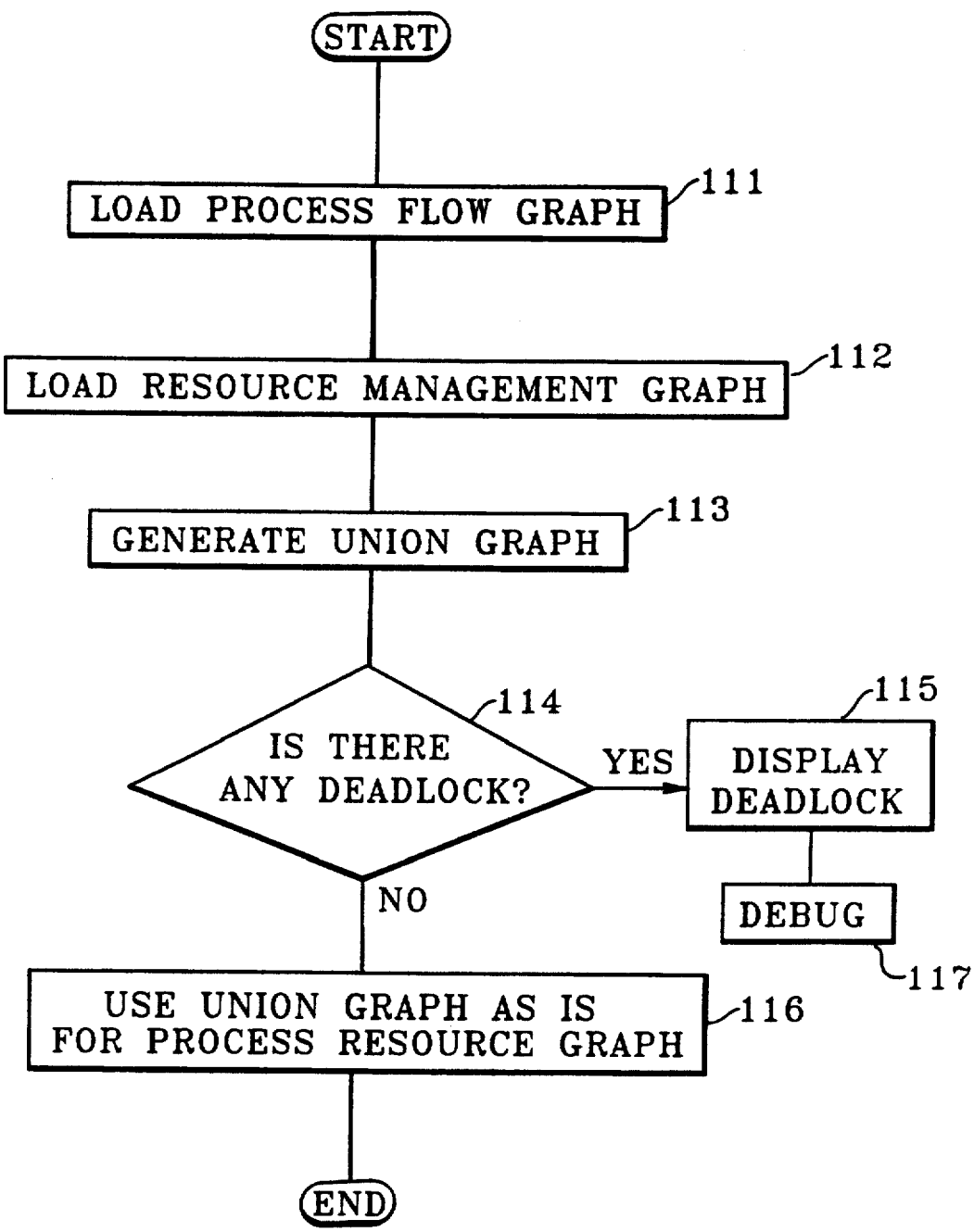
FIG. 11 is a flowchart illustrating the processing procedures for generating a process resource graph.

A flowchart of the process for generating the process resource graph is shown in FIG. 11. The process flow graph and the resource management graph are loaded in steps 111 and 112, from which a graph of their union is generated in step 113.

Figure 12:
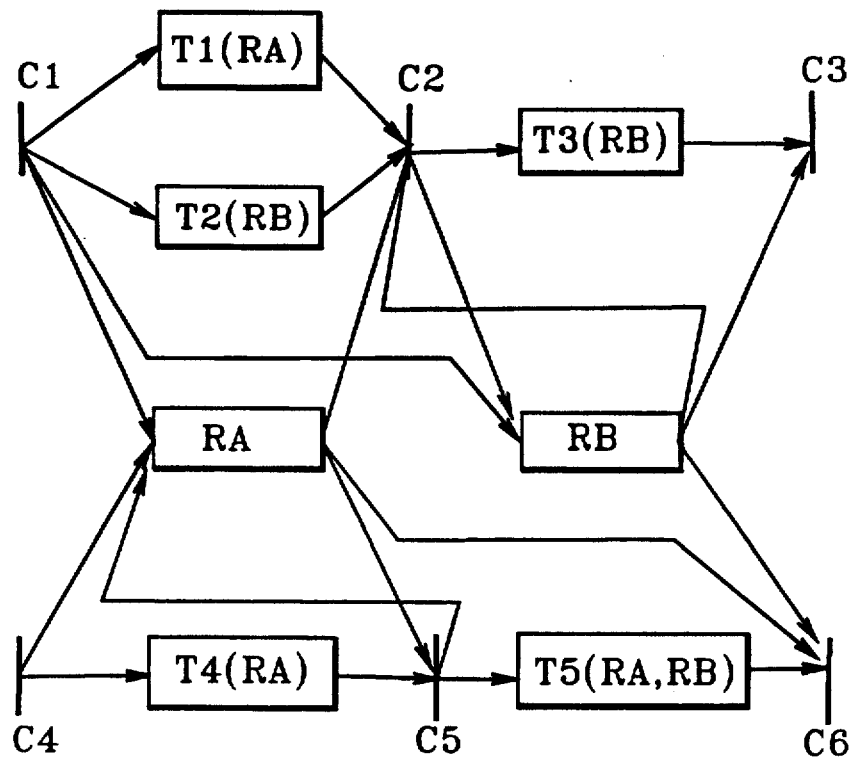
FIG. 12 is a diagram illustrating the process resource graph of this invention.

FIG. 12 shows a union graph generated from the process resource graph of FIG. 7 and the resource management graph of FIG. 9.

If the format for the intermediate code of the union graph is made the same as that for the intermediate codes of the process flow graph, the representation of the union graph of FIG. 12 is as follows:
  $C_1$: /$T_1$, $T_2$, $R_A$, $R_B$
  $C_2$: $T_1$, $T_2$, $R_A$, $R_B$/$T_3$, $R_B$
  $C_3$: $T_3$, $R_B$/
  $C_4$: /$T_4$, $R_A$
  $C_5$: $T_4$, $R_A$/$T_5$, $R_A$, $R_B$
  $C_6$: $T_5$, $R_A$, $R_B$/

Figure 13:
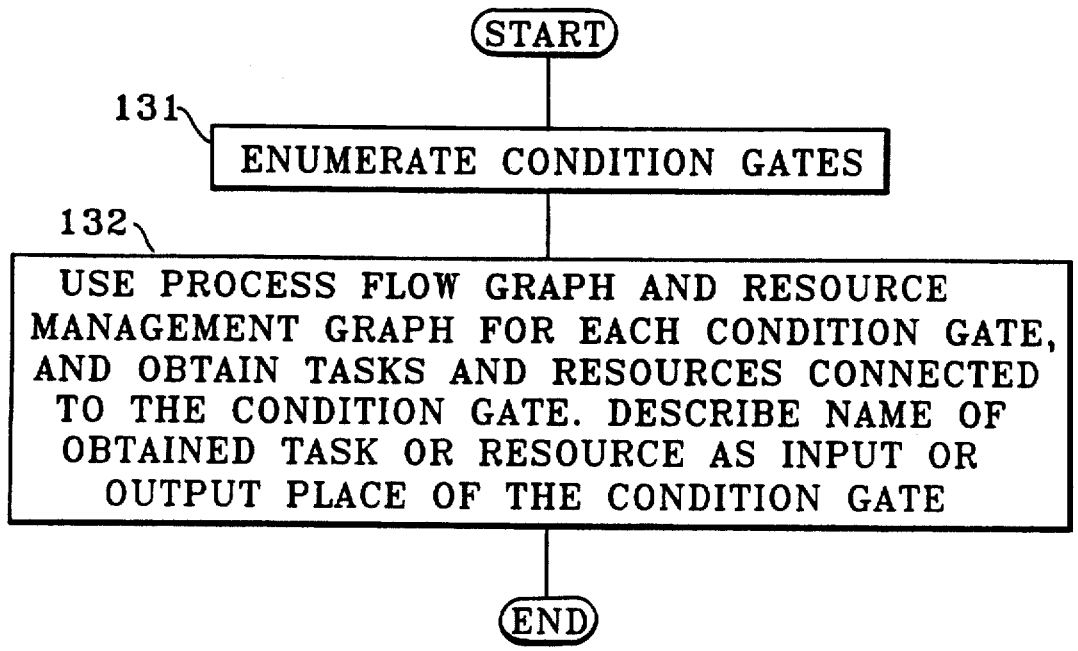
FIG. 13 is a flowchart illustrating the processing procedures for generating a union graph from a program flow graph and a resource management graph.

FIG. 13 is a flowchart illustrating an algorithm for generating the intermediate code from the process flow graph and the resource management graph, i.e., it shows step 113 of FIG. 11 in detail.

If the union graph thus generated is unconditionally regarded as a process resource graph as it is, a deadlock may be caused.

Figure 14:
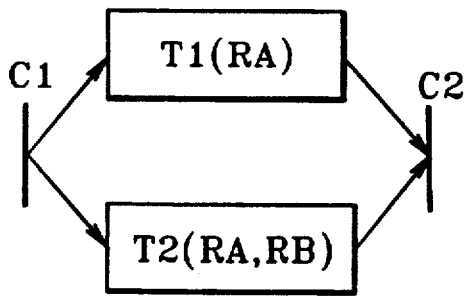
FIG. 14 is a diagram illustrating a process flow that causes a deadlock.

FIG. 14 shows a case where a deadlock is caused. In the initial state, a token is in the condition gate $C_1$. The deadlock is caused because the task $T_1$ should be executed while using the resource $R_A$, and the task $T_2$ should be executed while using the resources $R_A$ and $R_B$. If the common connection graph causes a deadlock, it is reported to the user for resolution.

The preferred embodiment uses a graph that avoids the deadlock shown on the common connection graph based on the process resource graph. When execution is performed accordingly, it is possible to simultaneously perform the control of an event driven process and mutually exclusive resource control.

Referring to FIG. 11, the deadlock that may be caused in the common connection graph is displayed in step 115 after checking for a deadlock at the time when the common connection graph is generated from the process flow graph and the resource management graph indicated by step 114.

Figure 15:
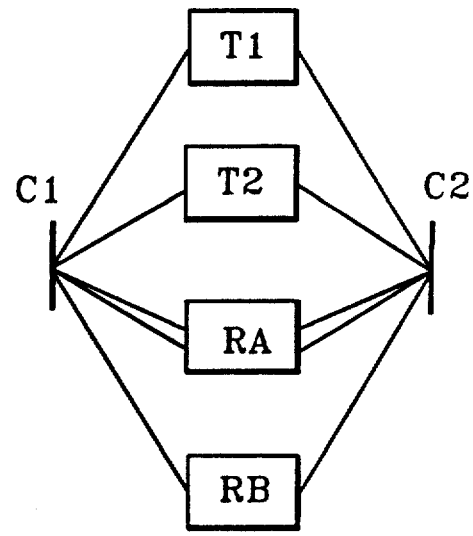
FIG. 15 is a diagram showing a union graph representation of the contents of FIG. 14 to detect deadlock.

FIG. 15 is a representation of the deadlock case of FIG. 14 in the form of a union graph. As shown in FIG. 15, a deadlock occurs in the case where a condition gate and a resource place are connected in duplicate. It is sufficient to check whether or not the generated union graph has a resource connected to one condition gate in duplicate, and to point it out to the user if there is one. If no deadlock occurs, the union graph is used as the process resource graph as is indicated by step 116 in FIG. 11.

Figure 6A:
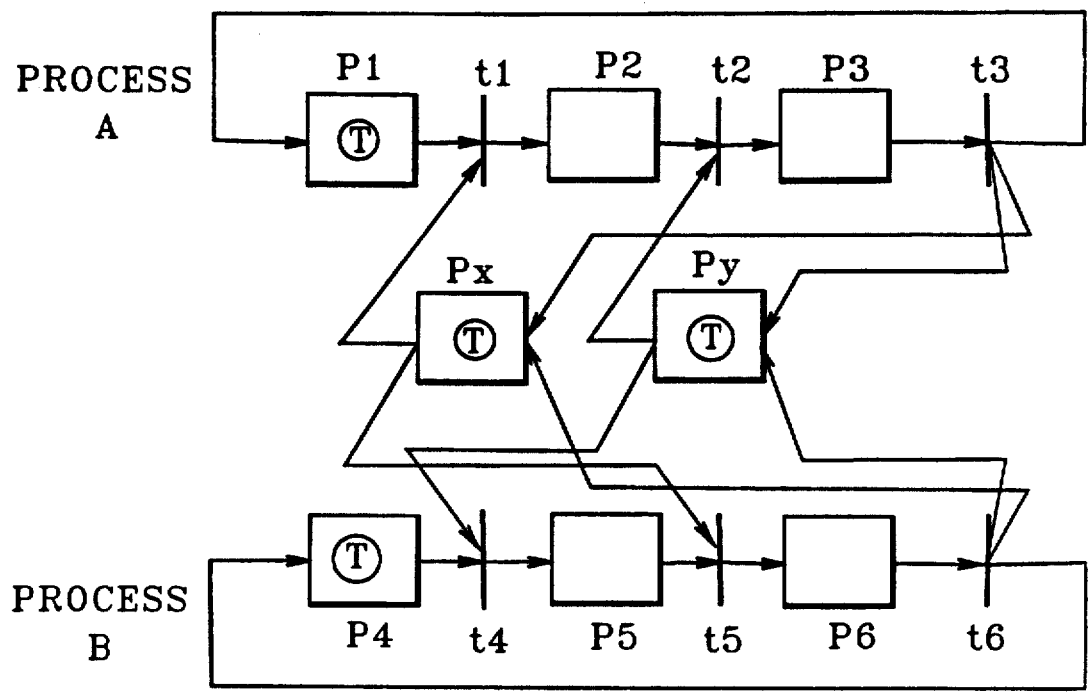
FIGS. 6A, 6B are diagrams illustrating that a deadlock can occur if a conventional Petri net is executed to perform the mutually exclusive control of resources.
Figure 6B:
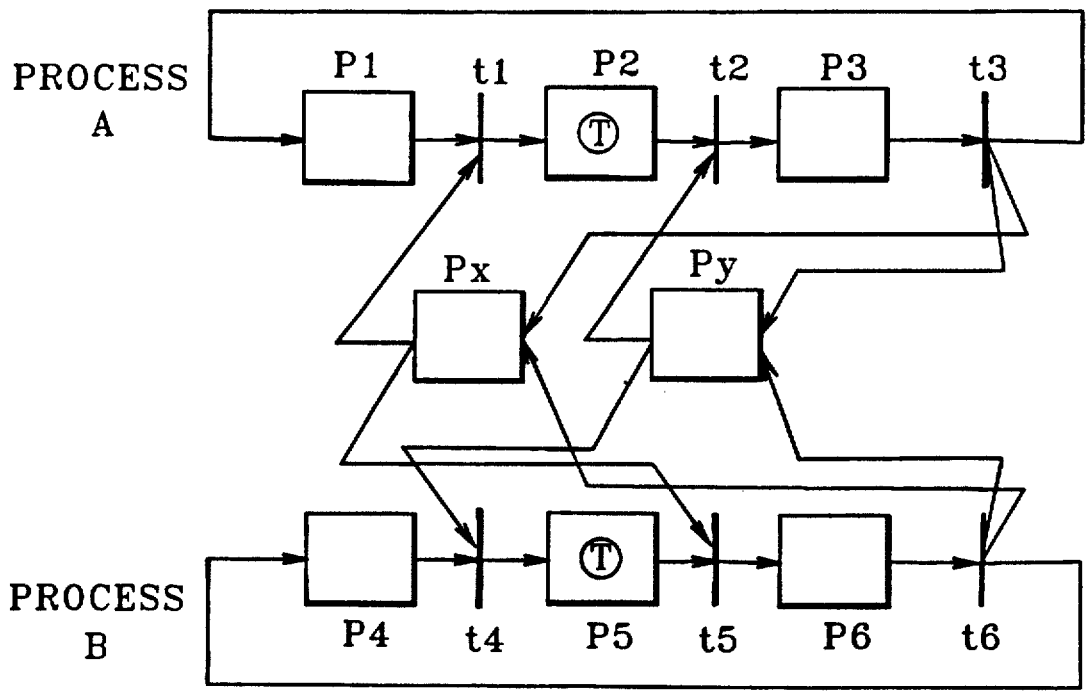

The deadlock referred to herein is not caused by the system that performs control according to the graphic representation described herein. As described later, occurrence of the deadlock as in FIG. 6 is avoided according to the invention. The deadlock displayed in step 115 of FIG. 11 is caused from the program structure itself, and is the responsibility of the user to avoid (step 117).

The process resource graph is a bipartite directed graph, nodes of which are event places and condition gates, and arcs of which are input functions and output functions. Marking means to assign tokens to the task places, the resource places, or the condition gates of the process resource graph. In addition, at most one token can exist in one task place, one resource place, or one condition place. In a conventional Petri-Net, a token is not assigned to a condition gate, while a token is assigned in the process resource graph. Refer to the Appendix for the mathematical representation of the process resource graph.

In the union graph or the process resource graph shown in FIG. 12, every task node is arranged in parallel with a resource node. However, in some cases tasks will never access a critical resource. In this situation, no resource node is arranged in parallel with such a task node (see FIG. 18).

(d) Execution of process resource graph (steps S7 and S8)

The process resource graph is converted into executable code for a controller that performs event driven control together with the mutually exclusive control of sequentially available resources, and is then loaded in the random access memory or ROM of the controller for execution (such as a computer or a programmable logic controller). When the process resource graph is executed, the mutually exclusive resource control and the event driven process control are simultaneously performed. For example, a node (an event place or a condition gate) of a process resource graph is implemented in memory as a data structure, and the connection between elements is represented by pointers. Information relating to the presence of a token is stored in the data structure. The method for generating or erasing a token is implemented similarly to the system described in the paper authored by Hasegawa and Takahashi and is incorporated by reference herein.

The conditions for transferring the token presented by the invention are strictly represented by equations (1) and (2) in the Appendix, which can be explained as follows:

(I) As soon as the beginning of execution of a task is directed, a token is assigned to the place (node) of the task and the resource place in parallel with the task place. That is, according to the invention, and different from the conventional Petri-Net representation, the token placed in the resource place indicates that the resource is appropriated by the task being executed.

(II) If there are tasks controlled in parallel, the tokens are transferred to a succeeding condition gate at the time when execution of all the tasks are completed.

(III) Until a token is assigned to at least one of the task places immediately after the condition gate and the resource places in parallel with the task places, the signal to begin execution of the succeeding task is delayed by keeping the token in the condition gate.

FIG. 16 shows an example of execution control following the definition of the process resource graph of FIG. 12. This figure illustrates the case where a token is generated first either in the condition gate $C_1$ or in the condition gate $C_4$. This discussion treats the case where the token is generated first in the condition gate $C_l$. As shown in FIG. 16A, the token is generated in the condition gate $C_1$. As illustrated, even if it is necessary to execute the tasks $T_1$ and $T_2$, tokens are not immediately placed in the places $T_1$ and $T_2$. First, the token is assigned to the condition gate $C_1$. The token moves from the condition gate $C_1$ to the task places $T_1$ and $T_2$, and the resource places $R_A$ and $R_B$ according to the transfer condition equation (1) in the Appendix (FIG. 16B). At this moment, even if a token is assigned to another condition gate, the transfer condition equation (1) is not satisfied because a token is assigned to the resource places $R_A$ and $R_B$. Therefore, the token does not move, and a new task other than $T_1$ and $T_2$ is not executed. When both tasks $T_1$ and $T_2$ are completed, the token moves from the task places $T_1$ and $T_2$ and the resource places $R_A$ and $R_B$ to the condition gate $C_2$ according to the transfer condition equation (2) in the Appendix (FIG. 16C). Next, the token moves from the condition gate $C_2$ to the task place $T_3$ and the resource place $R_B$ (FIG. 16D). At this moment, it is assumed that a token is generated in the condition gate $C_4$. The execution of the task $T_4$ can now be started. That is, because there is no token in the resource place $R_A$, the transfer condition equation (1) is satisfied so that the token is transferred to the task place $T_4$ and the resource place $R_A$ (FIG. 16E). Therefore, the execution of the task $T_3$ using the resource $R_B$ and the execution of the task $T_4$ using the resource $R_A$ are performed independently. When $T_4$ is completed, the token moves from the task place $T_4$ and the resource place $R_A$ to the condition gate $C_5$ (FIG. 16F). Even if a token is assigned to the condition gate $C_5$, the token is not transferred from the condition gate $C_5$ to the task place $T_5$ and the resource places $R_A$ and $R_B$, because another token already is assigned to the resource place $R_B$ and the transfer condition equation (1) is not satisfied. That is, the task $T_5$ is not executed. When the task $T_3$ is completed, the token moves from the task place $T_3$ and the resource place $R_B$ to the condition gate $C_3$ according to the transfer condition equation (2), and is removed. Therefore, the task $T_5$ becomes executable.

As seen from the example of FIG. 12, the process resource graph becomes a graph having self loops with respect to the resource places $R_A$ and $R_B$. When it is regarded as a restricted Petri-Net with a safe and active nature, if tasks attempt to sequentially and immediately use the same resource, a deadlock occurs. For example, in FIG. 12, if, the task $T_5$ attempts to perform execution using the resources $R_A$ and $R_B$ after the task $T_4$ completes execution using the resource $R_A$, a graph of a self loop with respect to the resource $R_A$ is constituted, and a deadlock is caused because the transfer condition equation (O), which is described later, is never satisfied.

This will be further described. First, it should be noted that the process resource graph representation in FIG. 12 itself is novel. (Differences from a conventional Petri-Net will be explained in more detail by comparing FIGS. 6 and 18 later). Next, it is assumed that a token is placed in a place of a held resource, but not placed in a condition gate. In this example, a token is placed in the places $T_4$ and $R_A$ during execution of the task $T_4$. Thus, even if the control system attempts to begin the execution of the task $T_5$, that is, even if it attempts to transfer a token from the place $T_4$ to the place $T_5$ and the places $R_A$ and $R_B$, it is impossible to transfer the token to the place $T_5$ because a token is already assigned to the place $R_A$. Then, as long as the token cannot move to the place $T_5$, the token in the place $R_A$ cannot be removed.

If a token is caused to exist in a condition gate as defined for the process resource graph, deadlock as in the restricted Petri-Net never occurs. That is, in the above example, at the time when the execution of the task $T_4$ is completed, a state where no token is assigned to the place $R_A$ results from removing the token from places $T_4$ and $R_A$, and by generating a token in the condition gate $C_5$, so that the token can be transferred from the condition gate $C_5$ to the places $T_5$, $R_A$, and $R_B$. That is, the execution of the task $T_5$ can be started. The significance of assigning a token to a condition gate lies in this point.

Figure 17:
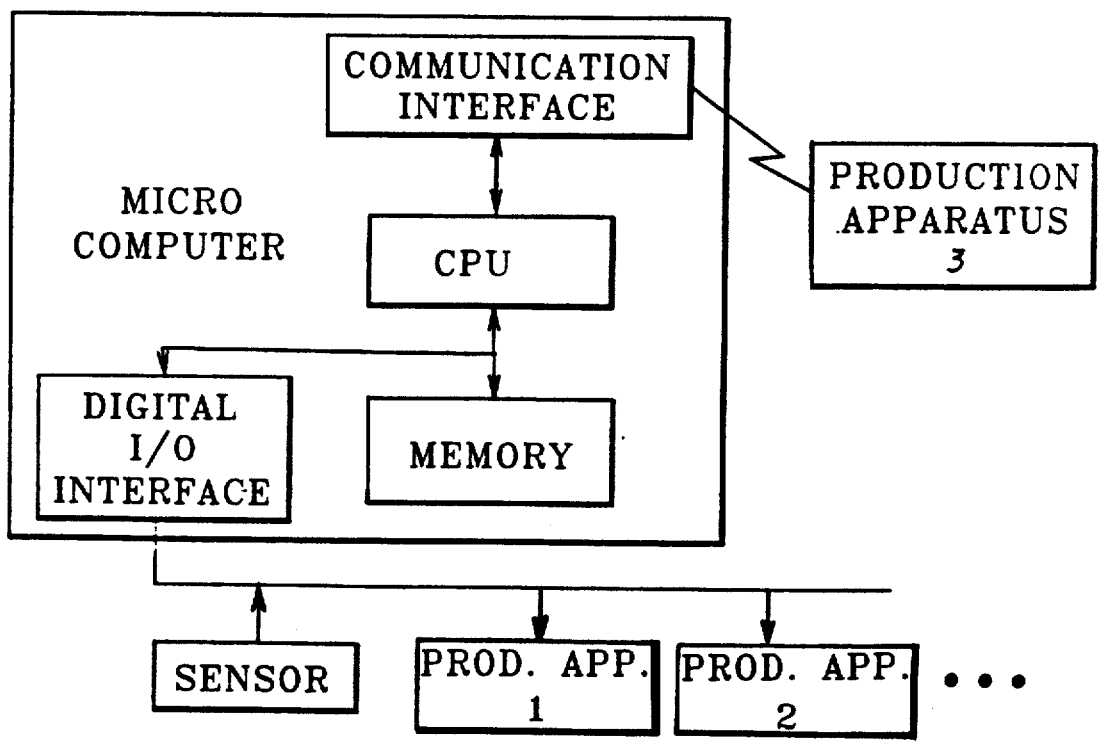
FIG. 17 is a diagram illustrating a hardware implementation of a mutually exclusive control system.
Figure 16A:
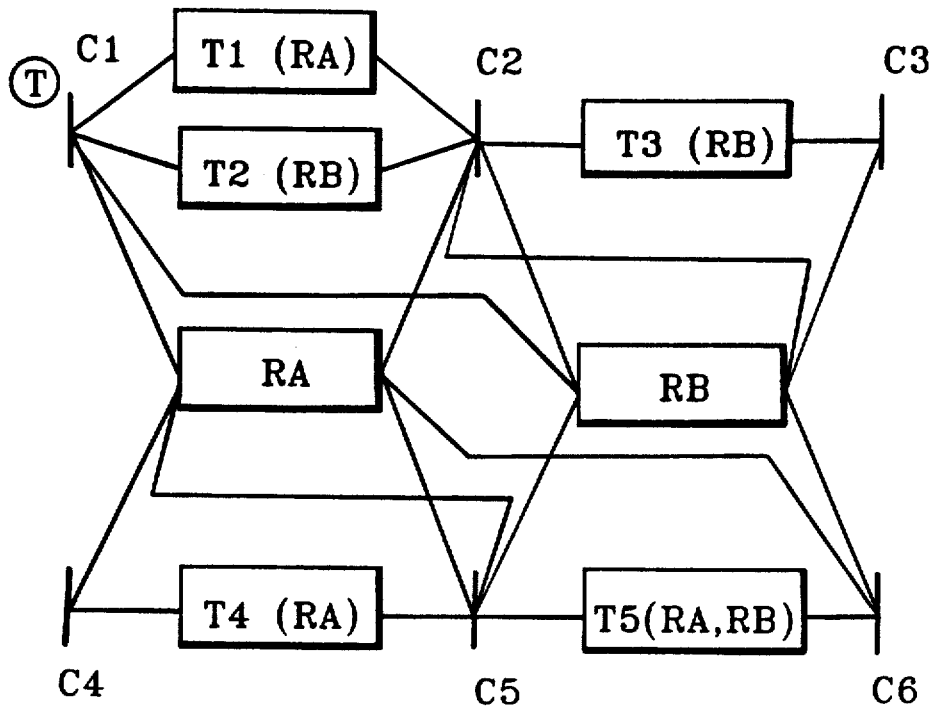
FIGS. 16A, 16B, 16C, 16D, 16E, 16F are diagrams showing the execution of the process resource graph of FIG. 12.
Figure 16B:
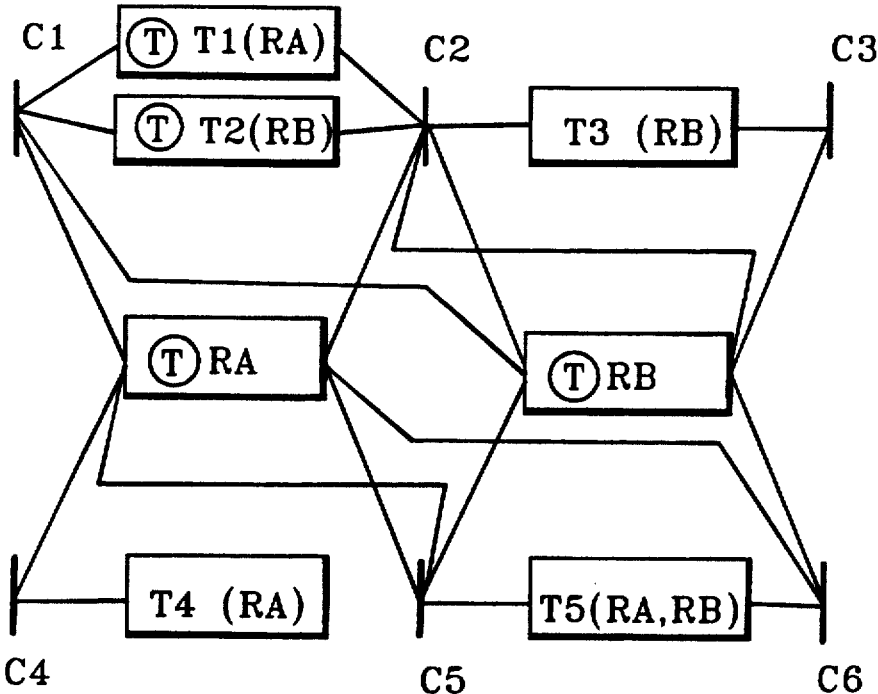
Figure 16C:
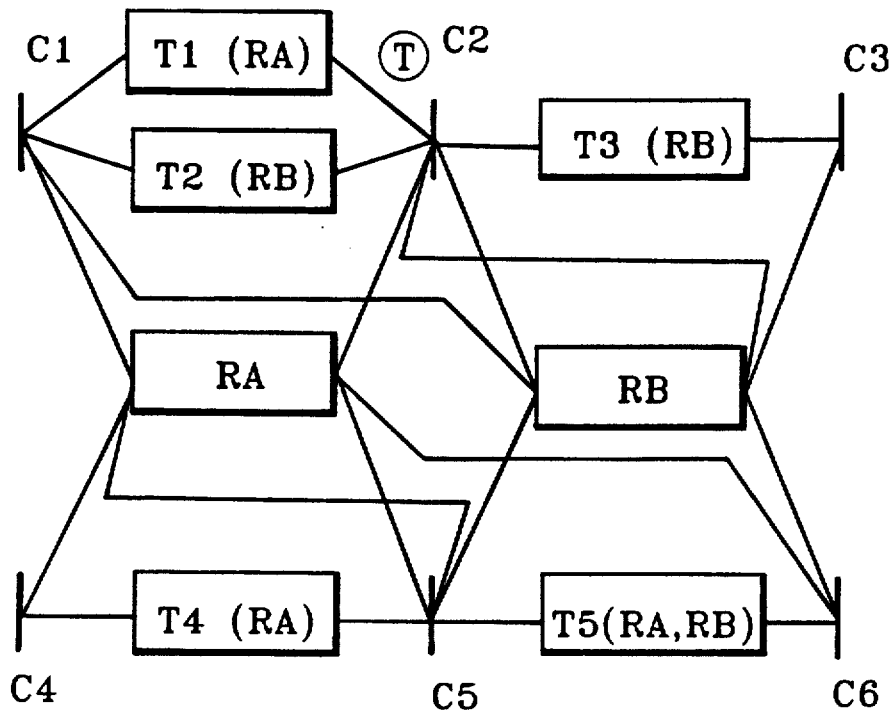
Figure 16D:
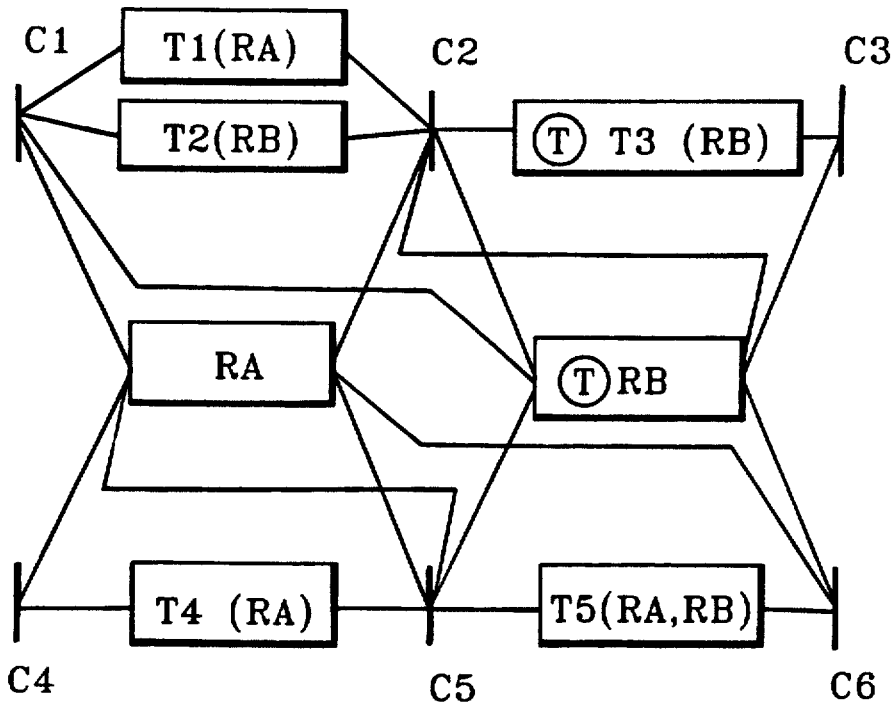
Figure 16E:
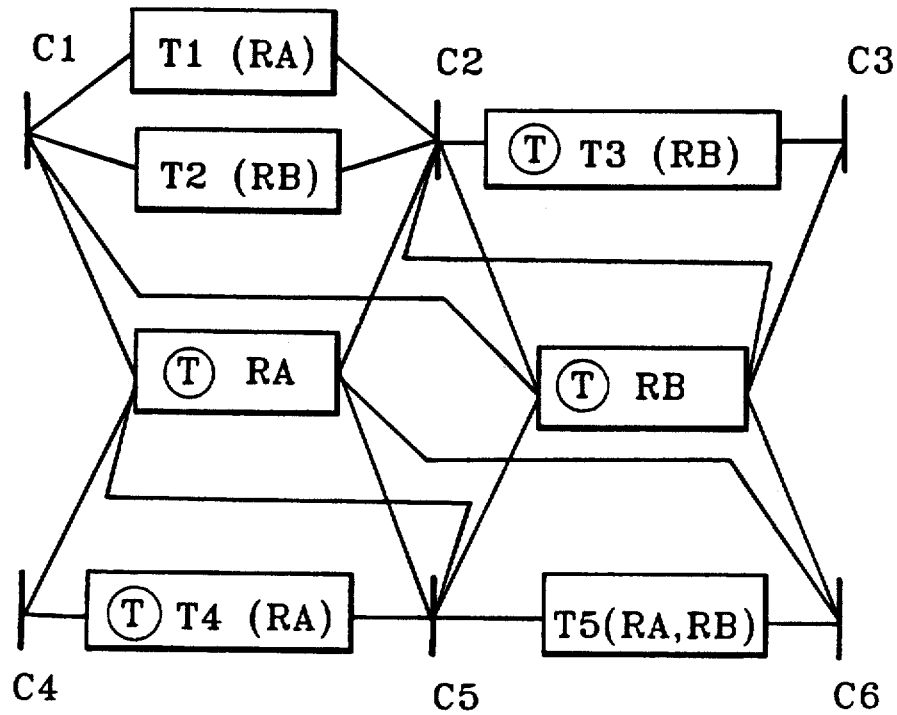
Figure 16F:
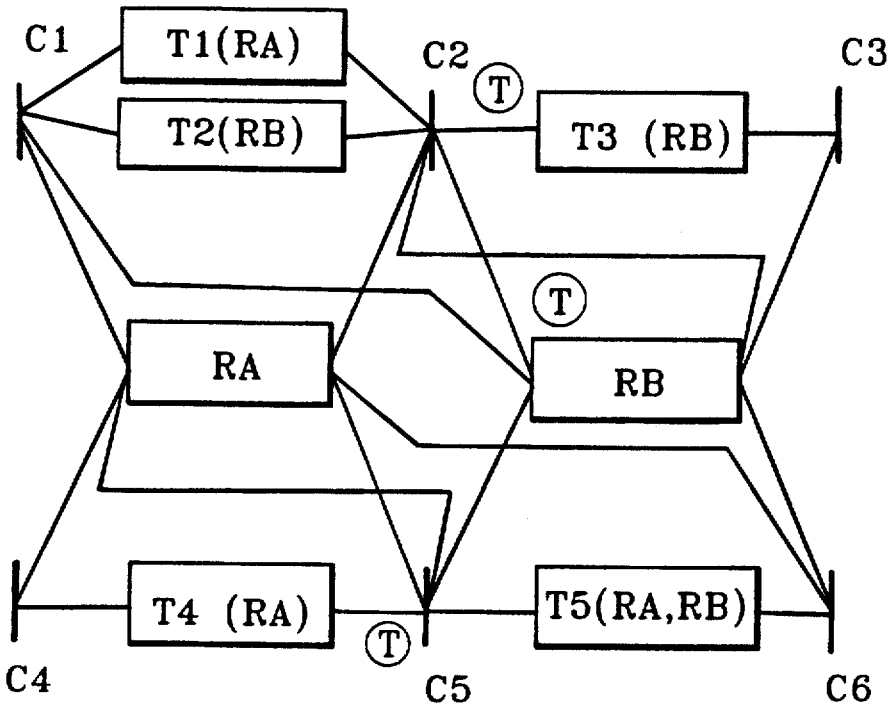

The executable codes of the process resource graph are loaded in the memory or ROM of the controller to be executed. Here, sequentially available resources to be controlled are ones that are controlled by a computer or a programmable logic controller (PLC). These resources include not only those actually contained in the controller, but also those that can be controlled through communications or the like. The invention performs mutually exclusive resource control together with event driven process control for the sequentially available resources based on the executable code of the process resource graph. FIG. 17 shows an example of the hardware configuration of a system that performs such control by loading the executable codes of the process resource graph. In this example, the production apparatus 1, 2, 3, . . . are the critical resources. A task using such apparatus is described in a task program as shown in FIG. 8. A signal directing the beginning of the execution of the program and an end signal notifying the completion of execution of the program are transferred between the PLC and the production apparatus through a digital input/output interface or a communications interface. The completion of execution of a task is detected by sending a signal from the production apparatus to the PLC. Otherwise, the PLC may monitor a state of the production apparatus to detect change of the state to the completion state.

In addition, a task program may be stored in the production apparatus, or may be stored in the memory of the PLC for sequential transfer of instructions from the PLC to the production apparatus.

Figure 18:
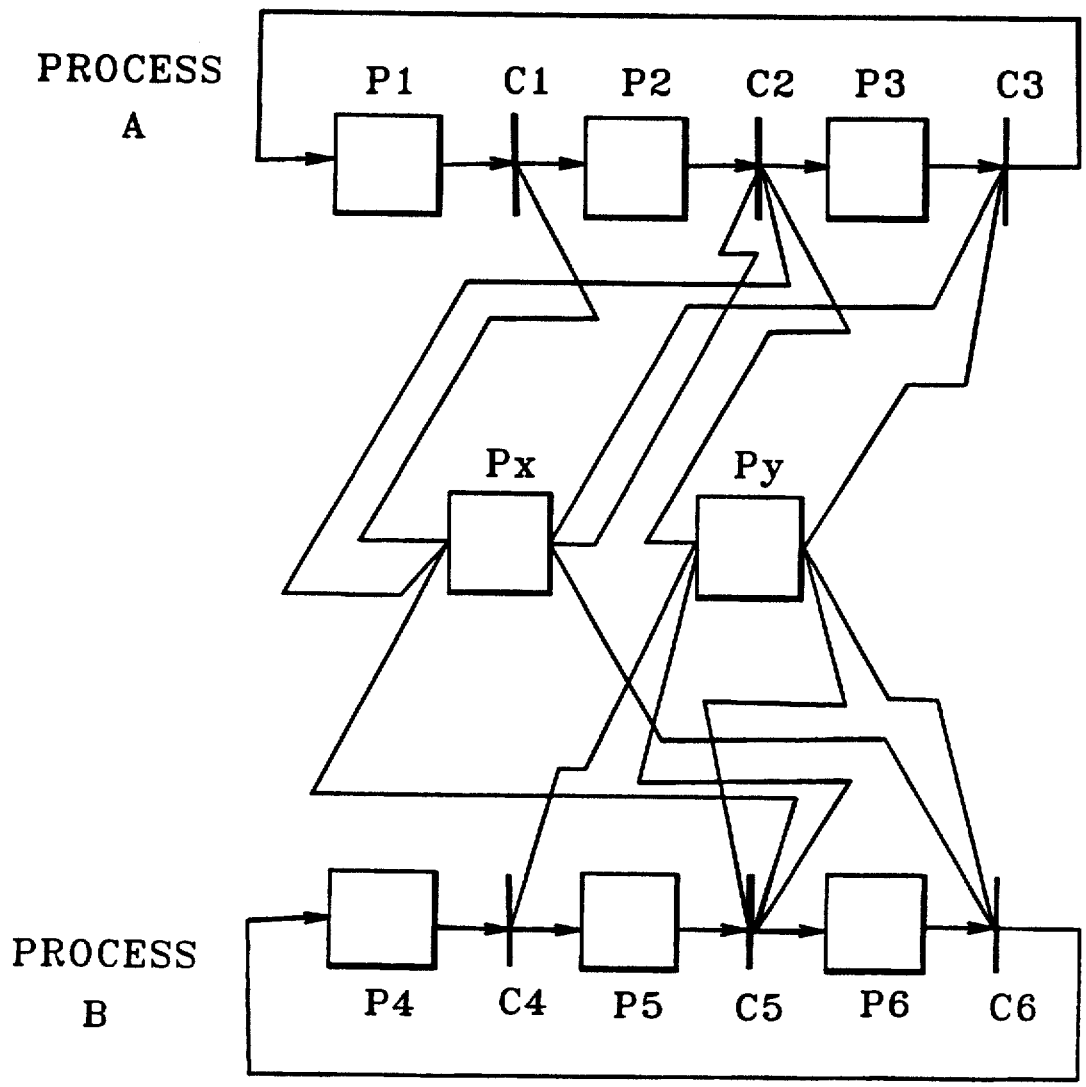
FIG. 18 is a diagram showing the process resource graph corresponding to the conventional Petri-net diagram of FIG. 6.

Finally, as a summary, the process resource graph according to the invention that corresponds to the Petri Net representation of the flow of processes shown in FIG. 6 is shown in FIG. 18, and an example of its execution is shown in FIGS. 19A through 19D.

The graph of FIG. 18 differs from that of FIG. 6 significantly in the following points. Even when two consecutive tasks (for example, $P_2$ and $P_3$) use a resource (in this case, $P_x$), the resource place is connected to each of them in parallel. Relations between the input and the output are reversed. For example, in FIG. 6, the place $P_x$ is connected to the input of the transition $t_1$, while, in FIG. 18, it is connected to the output of the condition gate $C_1$.

Figure 19A:
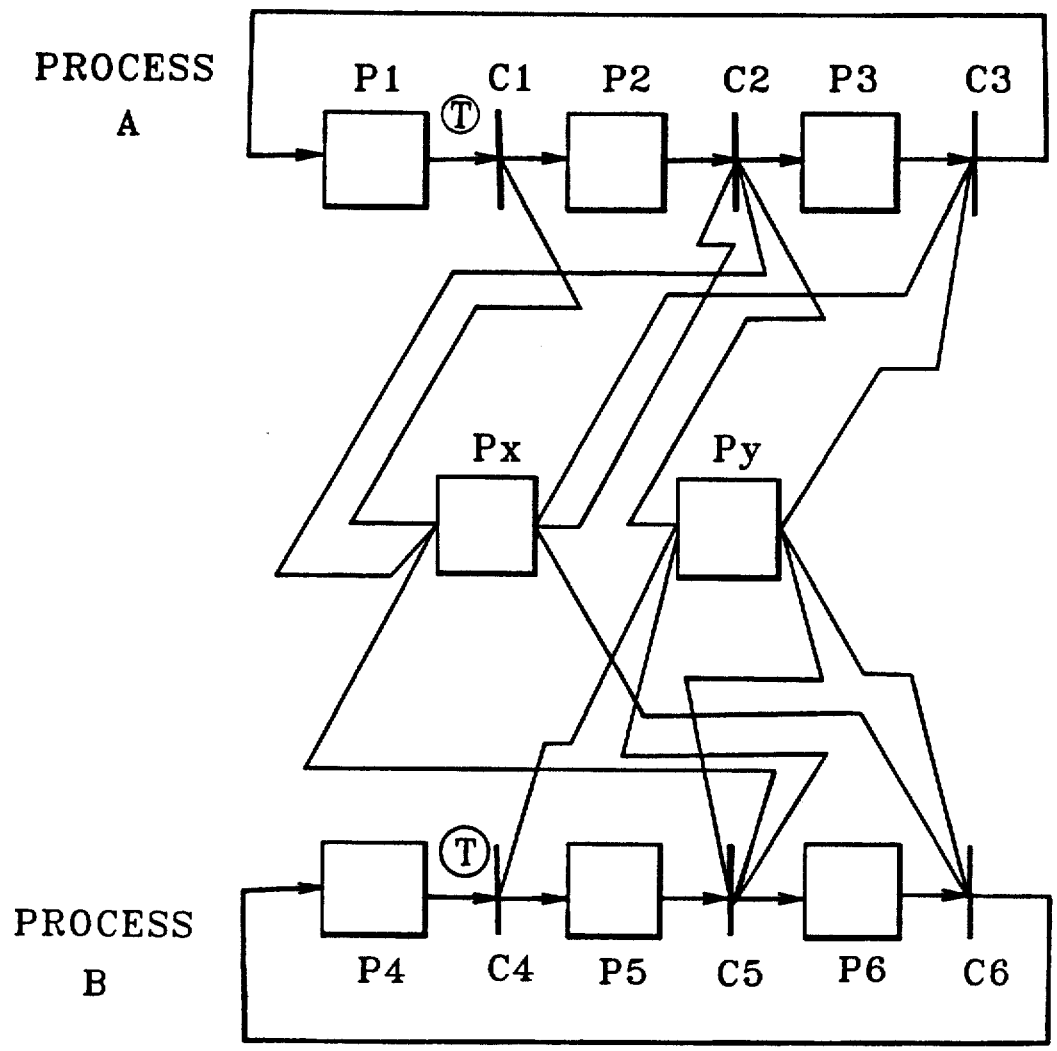
FIGS. 19A, 19B, 19C, 19D are diagrams showing the execution of the process resource graph of FIG. 18.
Figure 19B:
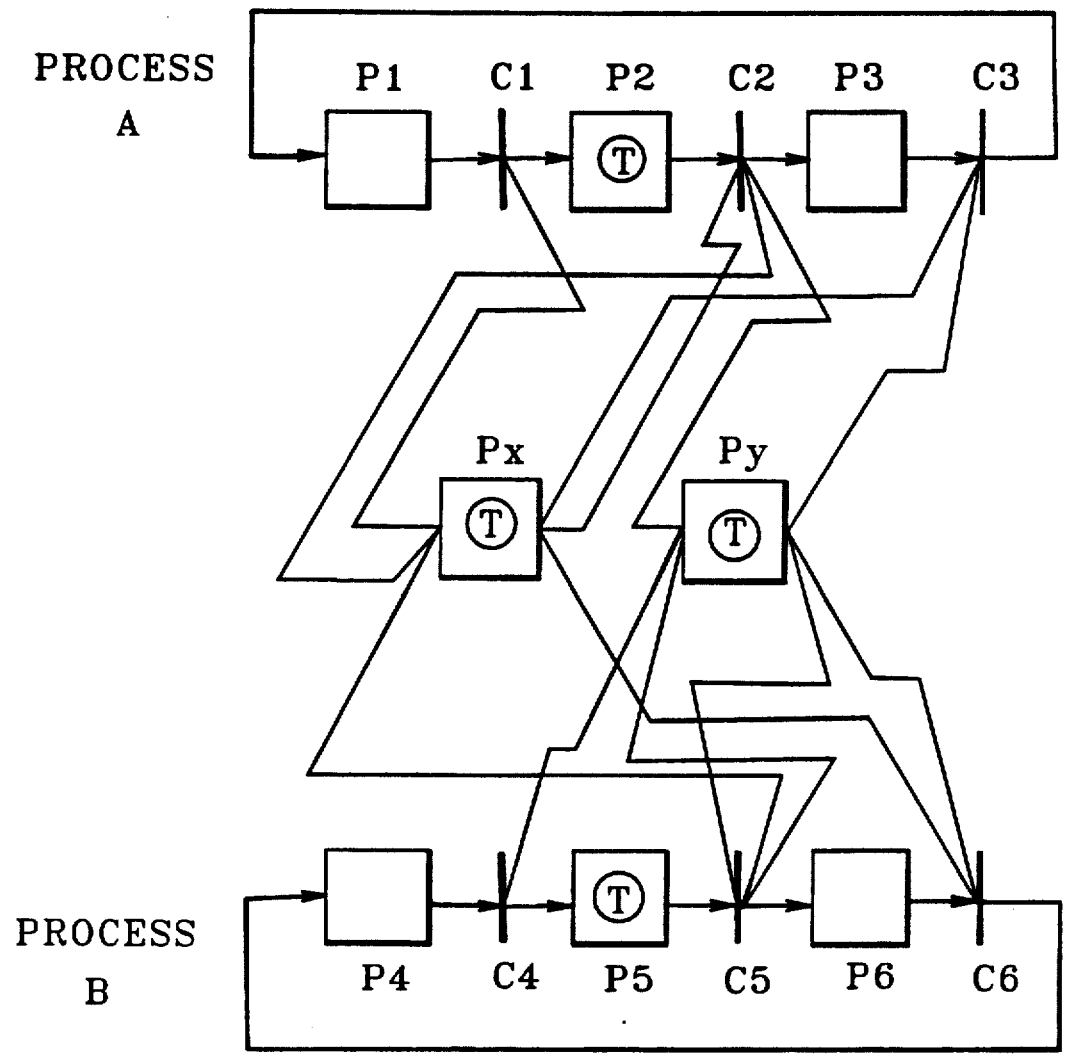
Figure 19C:
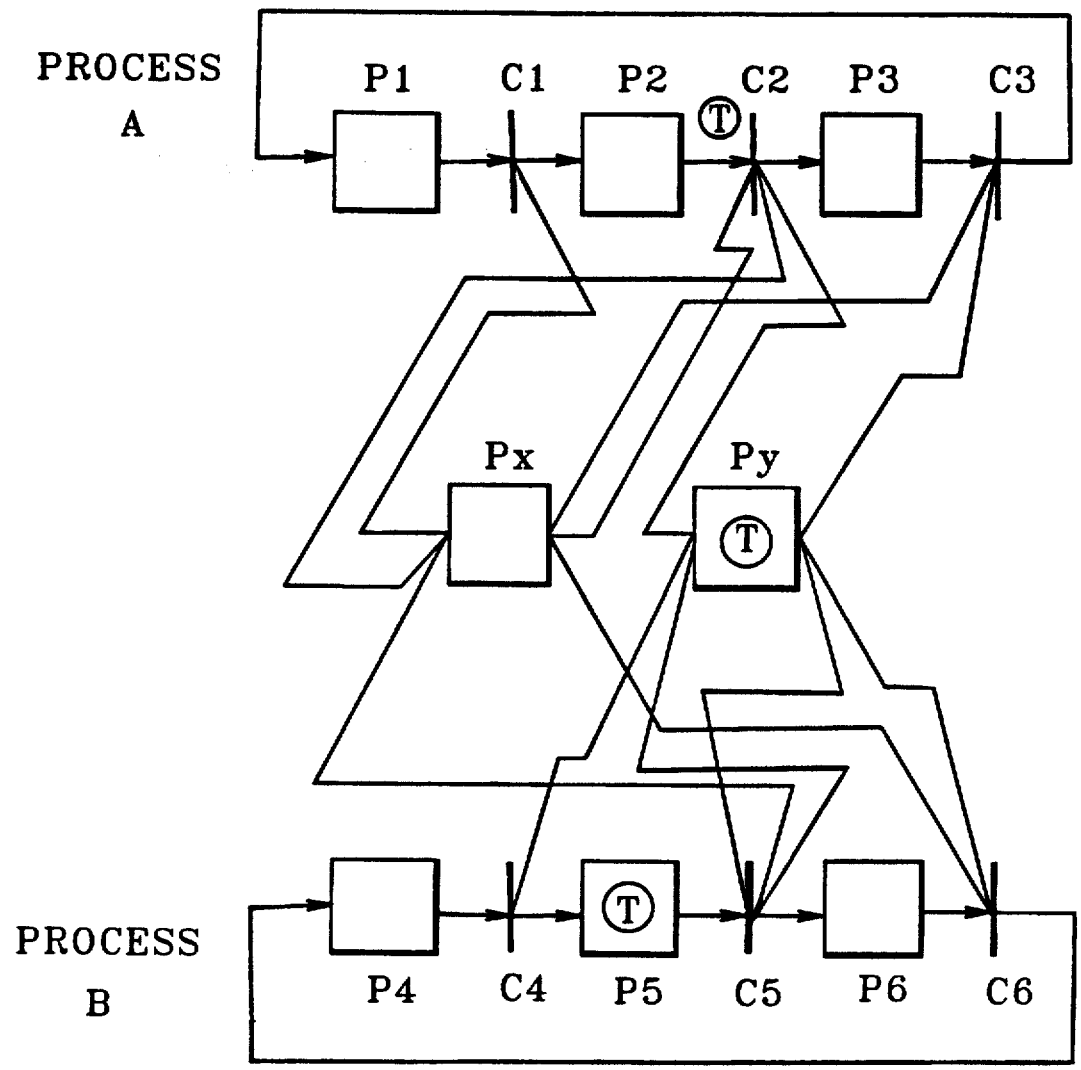
Figure 19D:
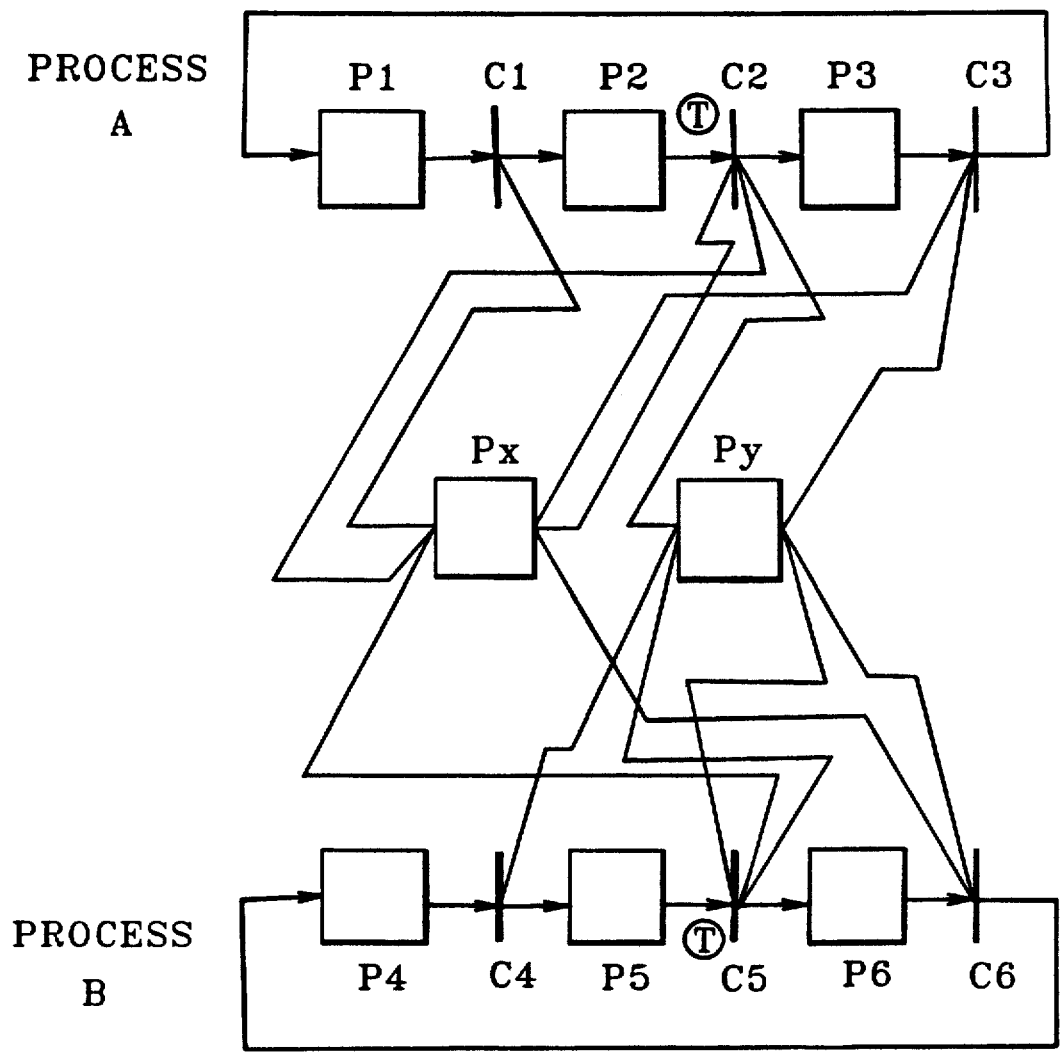

Now, an example of execution is discussed wherein a token is transferred according to the invention. First, it is assumed that tokens are generated in the condition gates $C_1$ and $C_4$ (FIG. 19A). If there is no token in either of the resource places $P_x$ and $P_y$, the token can be transferred from the condition gate $C_1$ to the places $P_2$ and $P_x$, and from the condition gate $C_4$ to the places $P_5$ and $P_y$ (FIG. 19B). That is, the execution of the tasks $P_2$ and $P_5$ is started. Then, it is assumed that the execution of the task $P_2$ is completed. At this time, the control system erases the tokens in the places $P_2$ and $P_x$, and generates a token in the condition gate $C_2$ (FIG. 19C). At this moment, because a token still is assigned to the place $P_y$, it is impossible to transfer the token to the place $P_3$. Thus, in the process A, the token remains in the condition gate $C_2$, and waits for release of the resource $P_y$. Then, when the control system receives a signal indicating the end of the task $P_5$, it removes the token from places $P_5$ and $P_y$, and generates a token in the condition gate $C_5$ (FIG. 19D). The control system may transfer the token to the places $P_3$, and $P_x$ and $P_y$, or may transfer the token to the places $P_6$ and $P_x$. That is, it can instruct the beginning of the execution of either task $P_3$ or $P_6$. The deadlock described in FIG. 6 never arises.

The invention has been explained by referring to the preferred embodiment. Other modifications are possible that are within the spirit and scope of this invention. For example, although, in the above embodiment, the process flow graph and the resource management graph are generated in a form of intermediate code, and the process resource graph is first generated in the form of intermediate code and then converted into executable code, the form of their representation is not restricted to this specific mode. It is sufficient for these graphs to generate in a memory representations that are equivalent to those represented in the drawings.

APPENDIX

This appendix provides a mathematical representation of the process flow theory of this invention.

A. The process flow graph $G_{PF}$ is defined using graph theory as follows:

$$G_{PF} = (T, C, I_T, O_T, \mu)$$

wherein:

$T = \{T_1, T_2, \ldots, T_M\}$, $M > 0$. Set of task places;
$C = \{C_1, C_2, \ldots, C_L\}$, $L > 1$. Set of condition gates;

$T \cap C = \Phi$. The set of the task places and the set of the condition gates are disjoint.

$I_T$: $T \rightarrow C$. Input function from a task place to a condition gate;

$O_T$: $C \rightarrow T$. Output function from a condition gate to a task place;

$\mu$: $T \rightarrow \{0, 1\}$. Marking function of a task place.

A transfer condition equation of a token from a task place $T_i$ to $T_o$ in respect to an arbitrary condition gate $C_K$ at an arbitrary time t is:

$$\#(Ti, To)(t) = \bigcap_{i=1}^{m1} \mu(Ti(t)) \wedge \overline{\bigcap_{o=1}^{m2} \mu(To(t))} \ldots (0)$$

wherein $m1 > 0$, $m2 > 0$.

A new marking at time $t+1$ is: in the task place $T_i$, $$\mu(Ti(t+1)) = \mu(Ti(t)) - \#(Ti, To)(t), i = 1 \ldots m1$$

in the task place $T_o$, $$\mu(To(t+1)) = \mu(To(t)) + \#(Ti, To)(t), o = 1 \ldots m2$$

A token is generated in a case where there is no input function $I_T$ in the condition gate $C_k$, and the right hand terms of the transfer condition equation become:

$$\bigcap_{i=1}^{m1}(Ti(t)) = 1$$

A token disappears in a case where there is no output function $O_T$ in the condition gate $C_K$, and the right hand terms of the transfer condition equation become:

$$\overline{\bigcap_{o=1}^{m2}(To(t))} = 1$$

B. The process resource graph $G_{PR}$ is defined using graph theory as follows:

$$G_{PR} = (T \cup R, C, I_T \cup I_R, O_T \cup I_R, \mu_T \cup \mu_R \cup \mu_C)$$

wherein:

$T = \{T_1, T_2, \ldots, T_M\}$, $M > 0$. Set of task places;
$R = \{R_1, R_2, \ldots, R_N\}$, N 0. Set of resource places;
$C = \{C_1, C_2, \ldots, C_L\}$, $L > 1$. Set of condition gates;
$T \cap R \cap C = \Phi$. The set of task places, the set of resource places and the set of the condition gates are disjoint;

$I_T$: $T \rightarrow C$. Input function from a task place to a condition gate;
$I_R$: $R \rightarrow C$. Input function from a resource place to a condition gate;
$I_T \cap I_R = \Phi$. The input function $I_T$ and the input function $I_R$ are disjoint;
$O_T$: $C \rightarrow T$. Output function from a condition gate to a task place;
$O_R$: $C \rightarrow R$. Output function from a condition gate to a resource place;
$O_T \cap O_R = \Phi$. The output function $O_T$ and the output function $O_R$ are disjoint;
$\mu_T$: $T \rightarrow \{0, 1\}$. Marking function of the task place;
$\mu_R$: $R \rightarrow \{0, 1\}$. Marking function of the resource place;
$\mu_C$: $C \rightarrow \{0, 1\}$. Marking function of the condition gate;
$\mu_T \cap \mu_R \cap \mu_C = \Phi$. The marking function $\mu_T$, the marking function $\mu_R$, and the marking function $\mu_C$ are disjoint.

A transfer condition equation of a token from an arbitrary condition gate $C_K$ to event places T and R at an arbitrary time t is:

$$\#(C, P)(t) = (\bigcap_{i=1}^{m} \mu(Ti(t)) \vee \bigcap_{j=1}^{n} \mu(Rj(t))) \wedge \overline{\mu(Ck(t))} \quad (1)$$

wherein $m > 0$, $n > 0$.

A new marking at time $t+1$ is: in the condition gate $C_K$, $$\mu(C_K(t+1)) = \mu(C_K(t)) - \#(C, P)(t)$$

in the task place T, $$\mu(Ti(t+1)) = \mu(Ti(t)) + \#(C, P)(t), i = 1 \ldots m,$$

in the resource place R, $$\mu(Rj(t+1)) = \mu(Rj(t)) + \#(C, P)(t), j = 1 \ldots n.$$

A transfer condition equation of a token to an arbitrary condition gate $C_K$ from event places T and R at an arbitrary time t is:

$$\#(C, P)(t) = (\bigcap_{i=1}^{m} \mu(Ti(t)) \wedge \bigcap_{j=1}^{n} \mu(Rj(t))) \wedge \overline{\mu(C_K(t))} \quad (2)$$

wherein $m > 0$, $n > 0$.

A new marking at time $t+1$ is: in the condition gate $C_K$, $$\mu(C_K(t+1)) = \mu(C_K(t)) + \#(P, C)(t)$$

in the task place T, $$\mu(Ti(t+1)) = \mu(Ti(t)) - \#(P, C)(t), i = 1 \ldots m,$$

in the resource place R, $$\mu(Rj(t+1)) = \mu(Rj(t)) - \#(P, C)(t), j = 1 \ldots n.$$

A token is generated in a case where there is no input function $I_T$ and $I_R$ in the condition gate $C_k$, and the right hand terms of the transfer condition equation (2) become:

$$(\bigcap_{i=1}^{m} \mu(Ti(t)) \wedge \bigcap_{j=1}^{n} \mu(Rj(t))) = 1$$

A token is removed in a case where there is no output function $O_T$ and $O_R$ in the condition gate $C_K$, and the right hand terms of the transfer condition equation (1) become:

$$(\overline{\bigcap_{i=1}^{m} \mu(Ti(t))} \quad \overline{\bigcap_{j=1}^{n} \mu(Rj(t))}) = 1$$

Having thus described our invention, what we claim and desire to secure by Letters Patent is as follows:

1. A computer implemented method for the control of mutually exclusive resources in a multi-tasking environment in which a plurality of tasks are executed using a plurality of critical resources, comprising the steps of:

generating a process resource graph representing the plurality of tasks to be performed using the plurality of critical resources, said process resource graph containing a plurality of task nodes, a plurality of resource nodes, a plurality of gate nodes and a plurality of arcs connecting each task node and each resource node to a pair of gate nodes, wherein the nodes of a pair of tasks executed concurrently are connected by arcs in parallel, the nodes of a pair of tasks executed sequentially are connected by arcs in series, and the node of each critical resource is connected in parallel with the node of each task that may appropriate the critical resource;

searching said process resource graph for a deadlock condition in which one of the resource nodes is connected to one of the gate nodes by more than one arc;

displaying said deadlock condition to a user for modification of said process resource graph to remove said deadlock condition;

converting said process resource graph into an executable control program;

loading said executable control program into a memory if said computer and generating a first token in a first gate node to start said executable control program by a processor;

generating a token by said processor in each task node and each resource node connected to said first gate node and removing said first token from said first gate node to begin execution of each task represented by said each task node connected to said first gate node;

after detecting completion of all tasks represented by said each task node connected to said first gate node, removing said token by said processor in each task node and each resource node connected to said first gate node and generating a token by said processor in a subsequent gate node;

testing each gate node periodically by said processor to determine if the tasks represented by the task nodes connected to said each gate node have the critical resources available for execution;

for each gate node having the critical resources available for execution, generating a token by said processor in each task node and each resource node connected to said each gate node, and removing said token in said each gate node to begin execution of each task represented by said each task node connected to said each gate node.

2. The computer implemented method of claim 1 wherein the step of generating a process resource graph includes:

generating a process flow graph by said user interactively, said process flow graph containing a plurality of task nodes connected by arcs between a plurality of gate nodes, each task node further identifying a plurality of critical resources needed by the corresponding task during execution of said task;

converting said process flow graph into a task description code by said user;

searching said task description code for said process flow graph by said processor to generate a list of resource nodes corresponding to said critical resources needed by said corresponding task nodes;

generating a resource management graph from said list of resource nodes by said processor, in the form of task description code, said resource management graph containing a plurality of resource nodes connected by arcs between a plurality of gate nodes; and from said task description code for said process flow graph and said resource management graph, overlapping the gate nodes on each graph to generate a task description code representing said process resource graph.

3. The computer implemented method of claim 1 wherein each of said plurality of task nodes, each of said plurality of resource nodes and each of said plurality of gate nodes is implemented as a data structure which is stored in said storage apparatus.

4. The computer implemented method of claim 3 wherein each of said plurality of arcs connecting each task node and each resource node to a pair of gate nodes is represented by a pointer stored with said data structure implementing each task node, each resource node and each gate node.

5. The computer implemented method of claim 3 wherein said data structure corresponding to each of said plurality of task nodes, each of said plurality of resource nodes, and each of said plurality of gate nodes contains a flag field, said flag field being set when the token corresponding to said data structure is generated, and said flag field being reset when the token corresponding to said data structure is removed.

6. A computer implemented system for the control of mutually exclusive resources in a multi-tasking environment in which a plurality of tasks are executed using a plurality of critical resources, said system comprising:

means for generating a process resource graph representing the plurality of tasks to be performed using the plurality of critical resources, said process resource graph containing a plurality of task nodes, a plurality of resource nodes, a plurality of gate nodes and a plurality of arcs connecting each task node and each resource node to a pair of gate nodes, wherein the nodes of a pair of tasks executed concurrently are connected by arcs in parallel, the nodes of a pair of tasks executed sequentially are connected by arcs in series, and the node of each critical resource is connected in parallel with the node of each task that may appropriate the critical resource;

means for searching said process resource graph for a deadlock condition in which one of the resource nodes is connected to one of the gate nodes by more than one arc;

means for displaying said deadlock condition to a user in order for the user to interactively remove said deadlock condition;

means for converting said process resource graph into an executable program;

means for loading said executable control program into a memory of said computer;

means, responsive to the operation of said executable control program, for testing each gate node periodically to determine if the tasks represented by the task nodes connected to said each gate node have the critical resources available for execution;

means, responsive to the operation of said executable control program, for generating a token in each gate node, and each task node and each resource node connected to said each gate node;

means, cooperative with said means for generating, for controlling the execution of each task corresponding to said each task node connected to said each gate node when said each task has the critical resources available for execution;

means, cooperative with said means for generating, for controlling the execution of each task corresponding to said each task node connected to said each gate node when said each task has the critical resources available for execution;

means, cooperative with said means for controlling, for detecting completion of all tasks represented by said each task node connected to said each gate node; and means, cooperative with said means for detecting completion and said means for controlling, for removing said token in each task node and each resource node connected to said each gate node.

7. The computer implemented system of claim 6 wherein said means for generating a process resource graph includes:

means for generating a process flow graph by said user interactively, said process flow graph containing a plurality of task nodes connected by arcs between a plurality of gate nodes, each task node further identifying a plurality of critical resources needed by the corresponding task during execution of said task;

means for converting said process flow graph into a task description code by said user;

means for searching said task description code for said process flow graph to extract a list of resource nodes corresponding to said critical resources needed by said corresponding task nodes;

means for generating a resource management graph from said list of resource nodes in the form of task description code, said resource management graph containing a plurality of resource nodes connected by arcs between a plurality of gate nodes; and means for combining said task description code for said process flow graph and said resource management graph to generate said process resource graph.

* * * * *